US012803430B2

(12) United States Patent
Vangara et al.

(10) Patent No.: US 12,803,430 B2
(45) Date of Patent: Nov. 17, 2026

(54) FAST FLY CAPACITOR PRE-CHARGING CIRCUIT

(71) Applicant: pSemi Corporation, San Diego, CA (US)

(72) Inventors: Satish Kumar Vangara, Woodley (GB); Antony Christopher Routledge, Oakley (GB)

(73) Assignee: pSemi Corporation, San Diego, CA (US)

( * ) Notice: Subject to any disclaimer, the term of this patent is extended or adjusted under 35 U.S.C. 154(b) by 107 days.

(21) Appl. No.: 18/535,703

(22) Filed: Dec. 11, 2023

(65) Prior Publication Data

US 2025/0192681 A1 Jun. 12, 2025

(51) Int. Cl.

*H02M 3/07* (2006.01)
*H02M 1/00* (2006.01)
*H02M 1/36* (2007.01)
*H02M 7/483* (2007.01)

(52) U.S. Cl.

CPC .......... *H02M 3/07* (2013.01); *H02M 1/0095* (2021.05); *H02M 1/36* (2013.01); *H02M 7/4837* (2021.05)

(58) Field of Classification Search

CPC .... H02M 7/4837; H02M 1/0095; H02M 3/07; H02M 1/36

See application file for complete search history.

(56) References Cited

U.S. PATENT DOCUMENTS 10,686,367 B1 6/2020 Low
10,720,842 B1 7/2020 Wu et al.
10,770,974 B2 9/2020 Wu et al.
10,992,226 B1 4/2021 Aboueldahab et al.
11,936,291 B2 3/2024 Szczeszynski
2022/0045622 A1* 2/2022 Oi ....................... H02M 7/5387
2022/0060183 A1* 2/2022 Yao ......................... H02M 1/08
2023/0136027 A1* 5/2023 Szczeszynski ...... H02M 1/0095 323/271
2023/0283198 A1* 9/2023 Kong ................... H02M 1/088 363/123
2024/0305194 A1* 9/2024 Anderson ............... H02M 1/38
2024/0396434 A1* 11/2024 Wu ......................... H02M 1/08

* cited by examiner

*Primary Examiner* — Alex Torres-Rivera

(74) *Attorney, Agent, or Firm* — Haynes and Boone, LLP

(57) ABSTRACT

Effective, efficient, and compact circuits and corresponding methods that enable startup of a multi-level (M-level) converter cell to ensure that driver circuits for power transistors are adequately powered in order to be able to switch the power transistors ON and OFF, and to ensure that all fly capacitors are pre-charged to a target voltage level before enabling operational mode switching of the M-level converter cell. Embodiments utilize the power available from a battery connected to an M-level converter cell and operate a converter cell in a boost mode to repeatedly transfer charge from the battery to one or more fly capacitors until a respective target voltage is reached for each fly capacitor.

19 Claims, 17 Drawing Sheets

200

400

500

1300

FAST FLY CAPACITOR PRE-CHARGING CIRCUIT

BACKGROUND

(1) Technical Field

This invention relates to electronic circuits, and more particularly to pre-charging circuits for multi-level power converters.

(2) Background

Many electronic devices, particularly mobile computing and/or communication products and components (e.g., notebook computers, ultra-book computers, and tablet devices) may be powered from multiple sources, including batteries, solar cells, and rectified AC sources (e.g., a USB charger or wireless charging circuitry). It is common to use a direct current power converter to generate a lower or higher voltage from a selected power source, such as a rectified AC source, to both power an electronic device and to charge a battery internal to the electronic device.

Power converters which generate a lower output voltage level from a higher input voltage power source are commonly known as buck converters, so-called because the output voltage $V_{OUT}$ is less than the input voltage $V_{IN}$, and hence the converter is "bucking" the input voltage. Power converters which generate a higher output voltage level from a lower input voltage power source are commonly known as boost converters, because $V_{OUT}$ is greater than $V_{IN}$. Some power converters may be either a buck converter or a boost converter depending on which terminals are used for input and output. Some power converters may provide an inverted output.

FIG. 1 is a block diagram of a prior art power converter 100. In the illustrated example, the power converter 100 includes a multi-level (M-level) converter cell 102 and a controller 104. The M-level converter cell 102 is configured to receive an input voltage $V_{IN}$ from a voltage source 106 (e.g., a rectified AC source) across terminals V1+, V1− (common), and transform the input voltage $V_{IN}$ into an output voltage $V_{OUT}$ across terminals V2+, V2− (common). The output voltage $V_{OUT}$ is generally coupled across an output capacitor $C_{OUT}$, across which may be connected to a load 108, such as a battery and/or an electronic device.

The controller 104 receives a set of input signals and produces a set of output signals. Some of these input signals arrive along a signal path 110 connected to the converter cell 102. Some input signals carry information indicative of the operational state of the converter cell 102. The controller 104 generally also receives one or more external input/output signals I/O that may be analog, digital (encoded or direct signal lines), or a combination of both, and a clock/timing signal CLK. Based upon the received input signals, the controller 104 provides a set of control signals, including clocking signals $\varphi_1 \ldots \varphi_n$, back to the converter cell 102 on the signal path 110 that control the internal components of the converter cell 102 (e.g., internal power switches, such as FETs, especially MOSFETs) to cause the converter cell 102 to convert $V_{IN}$ to $V_{OUT}$. Each power switch will generally have a level shifter and driver circuit coupled to a control input (e.g., the gate of a FET implementing the power switch) so as to enable switching the power switch ON or OFF based on a logic-level clock and/or control signal. In some embodiments, an auxiliary circuit (not shown) may provide various signals to the controller 104 (and optionally directly to the converter cell 102), such as the clock signal CLK, the input/output signals I/O, as well as various voltages, such as a general system supply voltage $V_{DD}$ and a transistor bias voltage $V_{BIAS}$.

One type of M-level converter cell 102 includes charge transfer capacitors as energy storage elements coupled by controlled power switches so as to transfer charge from $V_{IN}$ to $V_{OUT}$. Such charge transfer capacitors are commonly known as "fly capacitors" or "pump capacitors". Every time a fly capacitor is used (i.e., not bypassed), the electrical energy flowing through that fly capacitor generally will either charge it or discharge it.

One design challenge of a multi M-level converter cell 102 is charging its fly capacitors to a target voltage at startup before normal switching operation commences. The present invention provides an effective, efficient, and compact circuit that meets this design challenge.

SUMMARY

The present invention encompasses effective, efficient, and compact circuits and corresponding methods that enable startup of a multi-level (M-level) converter cell to ensure that driver circuits for power transistors are adequately powered in order to be able to switch the power transistors ON and OFF, and to ensure that all fly capacitors are pre-charged to a target voltage level before enabling operational mode switching of the M-level converter cell.

Embodiments of the present invention utilize the power available from a battery connected to an M-level converter cell and operate a converter cell in a boost mode to repeatedly transfer charge from the battery to one or more fly capacitors $C_{Fx}$ until a respective target voltage is reached for each fly capacitor. The M-level converter cell includes at least two "high-side" power FETs series-coupled between a $V_{IN}$ node and a middle node Lx, and at least two "low-side" power FETs series-coupled between the node Lx and a reference potential (e.g., circuit ground).

For example, all of the fly capacitors $C_{Fx}$ of an M-level power converter may be pre-charged using the following process for power FET state configurations: for the duration of pre-charging, the outermost low-side power FET (i.e., closest to the reference potential) is set to an ON state but in a current-limiting reduced gate drive (RGD) mode; all of the high-side power FETs are set to an OFF state; all low-side power FETs except the innermost low-side power FET (closest to node Lx) are set to an ON state; the innermost low-side power FET is set to toggling, which commences charging all of the fly capacitors $C_{Fx}$; toggling of the selected low-side power FET continues until an associated fly capacitor is fully pre-charged to a respective target voltage level; and if any remaining fly capacitors $C_{Fx}$ need to be fully pre-charged, a next low-side power FET, further from node Lx, is selected for toggling along with the previously toggling low-side power FET or FETs until the fly capacitor associated with that next low-side power FET is fully pre-charged. This last step repeats until all fly capacitors are fully pre-charged to respective target voltage levels. Once full pre-charging of all fly capacitors has occurred, the M-level converter cell can continue any additional startup procedures that may be needed and normal switching operation may commence, with the M-level power converter configured for either boost or buck operation as may be needed for a particular application or situation.

The details of one or more embodiments of the invention are set forth in the accompanying drawings and the description below. Other features, objects, and advantages of the invention should be apparent from the description and drawings, and from the claims.

DESCRIPTION OF THE DRAWINGS

Like reference numbers and designations in the various drawings indicate like elements unless the context requires otherwise.

DETAILED DESCRIPTION

The present invention encompasses effective, efficient, and compact circuits and corresponding methods that enable startup of a multi-level (M-level) converter cell to ensure that driver circuits for power transistors are adequately powered in order to be able to switch the power transistors ON and OFF, and to ensure that all fly capacitors are pre-charged to a target voltage level before enabling operational mode switching of the M-level converter cell.

Figure 1:
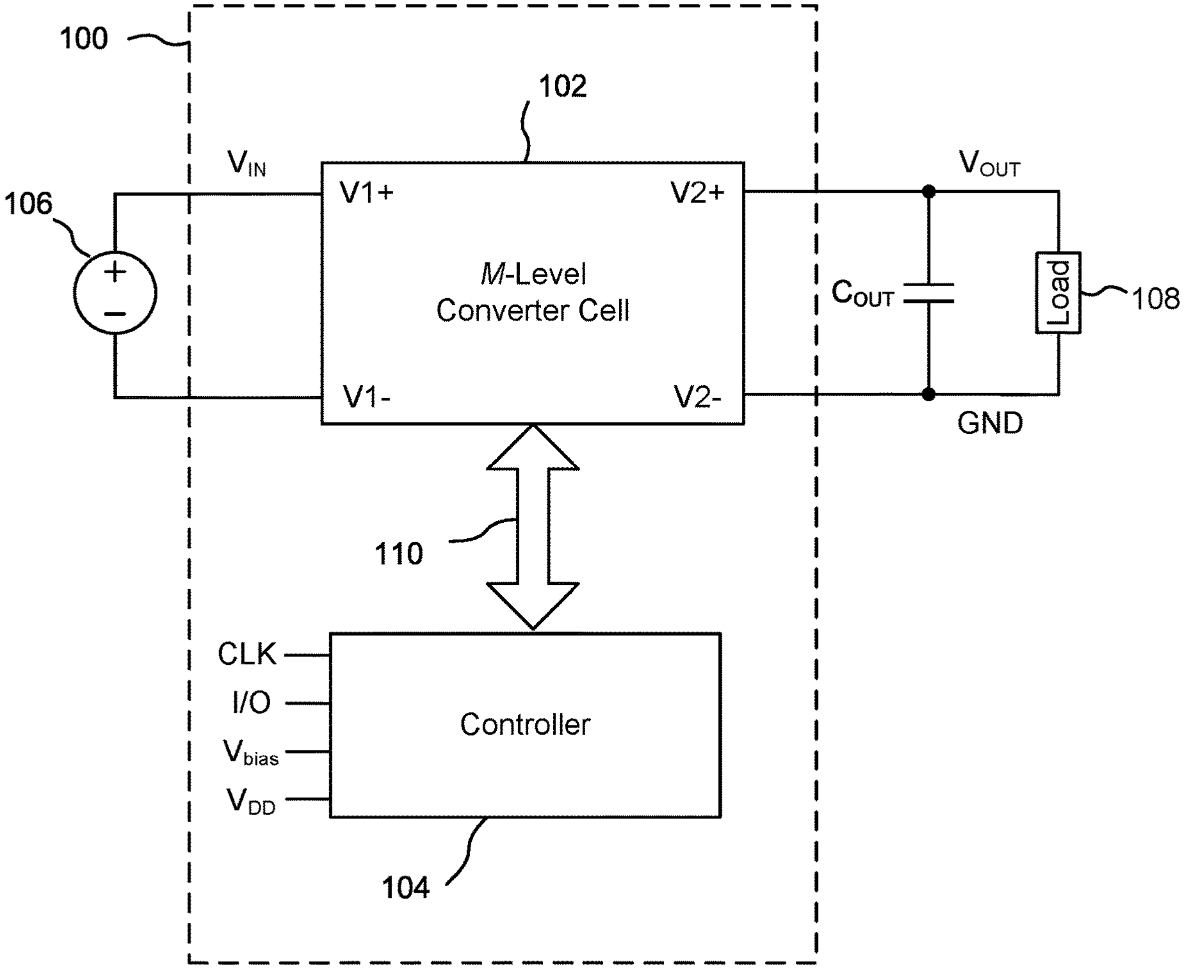
FIG. 1 (Prior Art)
FIG. 1 is a block diagram of a prior art power converter.
Figure 2:
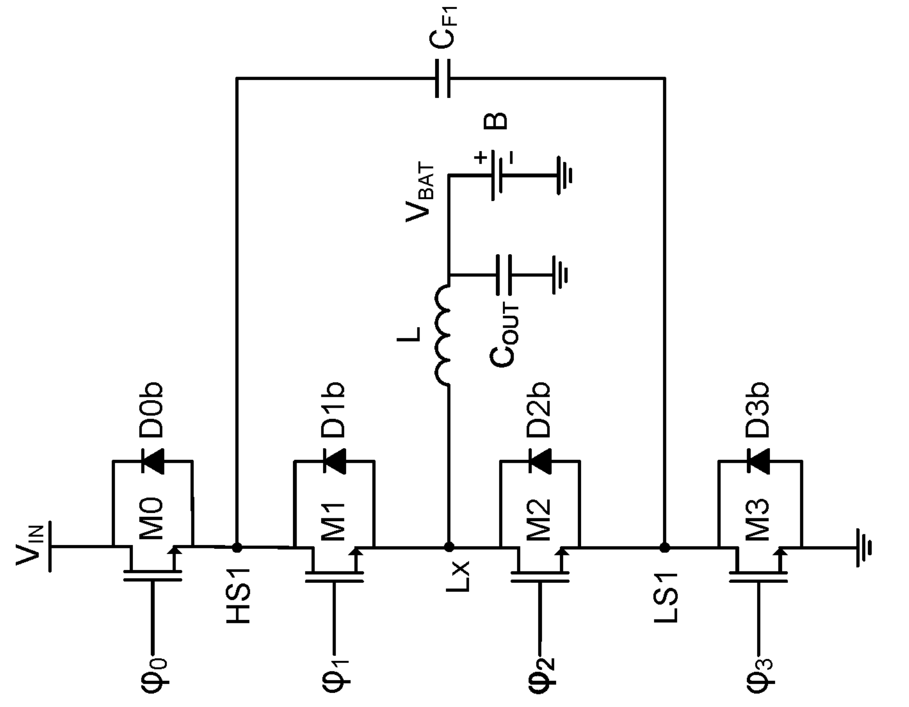
FIG. 2 (Prior Art)
FIG. 2 is a schematic diagram of a prior art 3-level converter cell.

It may be useful to better understand the challenges of power converter circuit startup before normal switching operation commences in an example M-level converter cell. FIG. 2 is a schematic diagram of a prior art 3-level converter cell 200. Power field-effect transistors (FETs) M0-M3 have their conduction channels (drain-to-source) coupled in series between an input voltage $V_{IN}$ and a reference potential (e.g., circuit ground). Each power FET M0-M3 is shown with a respective inherent body diode D0*b*-D3*b* connected in parallel with the associated FET. Clocking signals $\varphi_0$-$\varphi_3$ applied to respective power FETs M0-M3 control the ON (conducting) or OFF (blocking) state of the power FETs. (Note that level shifting, driver, and control circuitry has been omitted for the sake of simplicity).

An energy-storage fly capacitor CHI is coupled between a high-side node HS1 (between power FETs M0 and M1) and a low-side node LSI (between power FETs M2 and M3). An energy-storage inductor L is coupled between a battery B and a node Lx which separates the high-side power FETs M0, M1 from the low-side power FETs M2, M3. The voltage across the battery B is $V_{BAT}$. An output capacitor $C_{OUT}$ is coupled between the inductor L and a reference potential. In some embodiments, the output capacitor $C_{OUT}$ may either be pre-charged by other circuitry (not shown) or retain charge from prior power converter cell operation and thus function like the battery B for purposes of pre-charging the fly capacitor CHI as described below.

The 3-level converter cell of FIG. 2 enables generation of three instantaneous voltage levels at node Lx during normal operation, depending on the ON-OFF state of power FETs M0-M3: $V_{IN}$, $V_{IN}/2$, or 0V. For example, if $V_{IN}=5V$, then during normal operation Lx can have the values 5V, 2.5V, or 0V. By switching clocking signals $\varphi_0$-$\varphi_3$ in particular patterns, the average voltage at node Lx can be maintained between about 0V and 2.5V or between about 2.5 V and 5V. Note that a conventional buck converter would lack capacitor CHI and power FETs M0 and M3, and can only generate two instantaneous voltage levels at node Lx during normal operation, $V_{IN}$ or 0V. In a 3-level converter cell, the Lx node switching levels are reduced by one-half compared to a conventional buck converter. A 3-level converter cell offers the following advantages over a conventional buck converter: lower switching losses, higher efficiency, higher output current, and a smaller inductor requirement (which results in a reduction in circuit size).

Following are examples of normal operation of the 3-level converter cell of FIG. 2 that assume that $V_{BAT}<V_{IN}/2$ and that the voltage $V_{FLY}$ across the fly capacitor CHI is $V_{IN}/2$: (1) in a charging state for the fly capacitor $C_{F1}$, during a first half of a clock cycle, power FETs M0 and M2 will be ON and power FETs M1 and M3 will be OFF, and during a second half of the clock cycle, power FETs M0 and M1 will be OFF and power FETs M2 and M3 will be ON; and (2) in a discharging state for the fly capacitor $C_{F1}$, during a first half of a clock cycle, power FETs M0 and M2 will be OFF and power FETs M1 and M3 will be ON, and during a second half of the clock cycle, power FETs M0 and M1 will be OFF and power FETs M2 and M3 will be ON.

Following are examples of normal operation of the 3-level converter cell of FIG. 2 that assume that $V_{BAT}>V_{IN}/2$ and that the voltage $V_{FLY}$ across the fly capacitor $C_{F1}$ is $V_{IN}/2$:

(1) in a charging state for the fly capacitor CHI, during a first half of a clock cycle, power FETs M0 and M1 will be ON and power FETs M2 and M3 will be OFF, and during a second half of the clock cycle, power FETs M0 and M2 will be ON and power FETs M1 and M3 will be OFF; and (2) in a discharging state for the fly capacitor $C_{F1}$, during a first half of a clock cycle, power FETs M0 and M1 will be ON and power FETs M2 and M3 will be OFF, and during a second half of the clock cycle, power FETs M0 and M2 will be OFF and power FETs M1 and M3 will be ON.

Normal operation of the 3-level converter cell of FIG. 2 critically depends on maintaining the voltage $V_{FLY}$ across the fly capacitor $C_{F1}$ at $V_{IN}/2$, otherwise the current through the inductor L may reach over-current or negative-current limits that may damage the circuit.

Figure 3A:
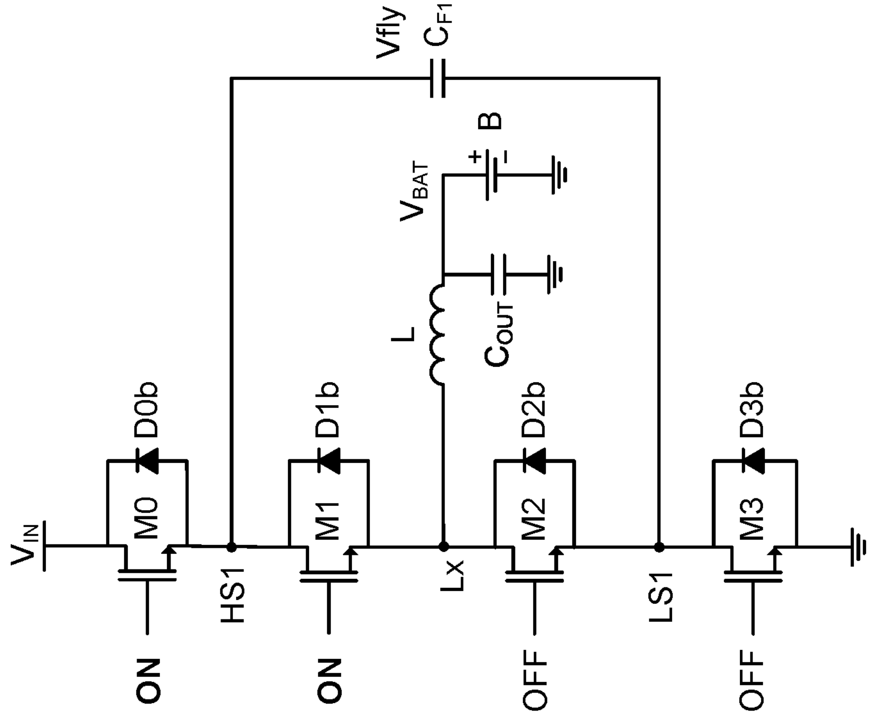
FIG. 3A is a schematic diagram of the 3-level converter cell of FIG. 2 in a first switch configuration representing the first half of a charging clock cycle while $V_{BAT}>V_{IN}/2$.
Figure 3B:
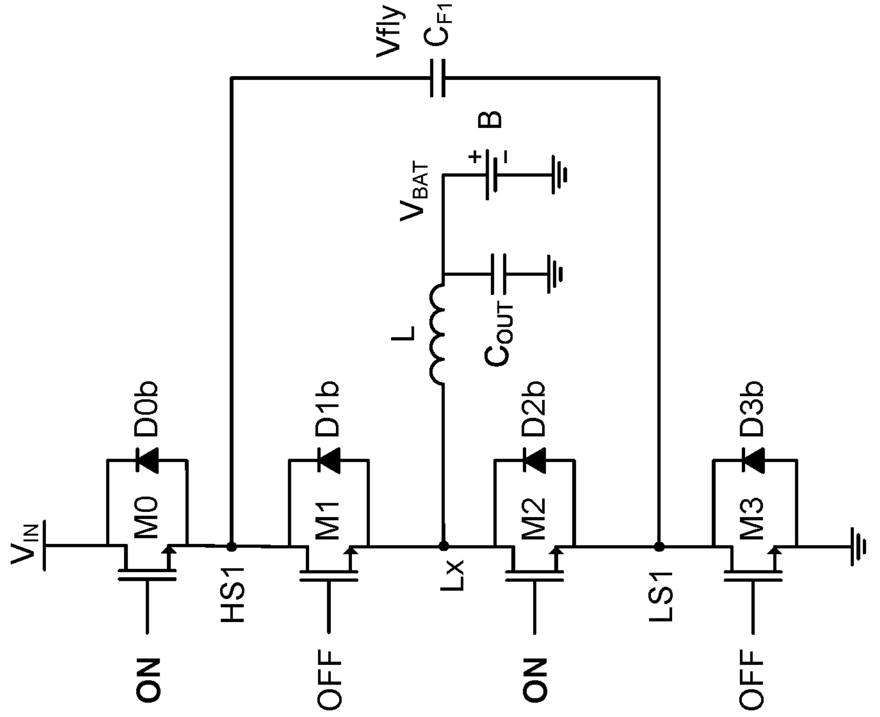
FIG. 3B is a schematic diagram of the 3-level converter cell of FIG. 2 in a second switch configuration representing the second half of a charging clock cycle while $V_{BAT}>V_{IN}/2$.

As one example of the importance of maintaining the voltage $V_{FLY}$ across the fly capacitor $C_{F1}$ at $V_{IN}/2$, consider the switch configurations of a 3-level converter cell during a charging clock cycle as shown in FIGS. 3A and 3B. FIG. 3A is a schematic diagram of the 3-level converter cell of FIG. 2 in a first switch configuration representing the first half of a charging clock cycle while $V_{BAT}>V_{IN}/2$. FIG. 3B is a schematic diagram of the 3-level converter cell of FIG. 2 in a second switch configuration representing the second half of a charging clock cycle while $V_{BAT}>V_{IN}/2$. Thus, during the first half of a clock cycle, power FETs M0 and M1 are ON and power FETs M2 and M3 are OFF, and during the second half of the clock cycle, power FETs M0 and M2 are ON and power FETs M1 and M3 are OFF.

Figure 4:
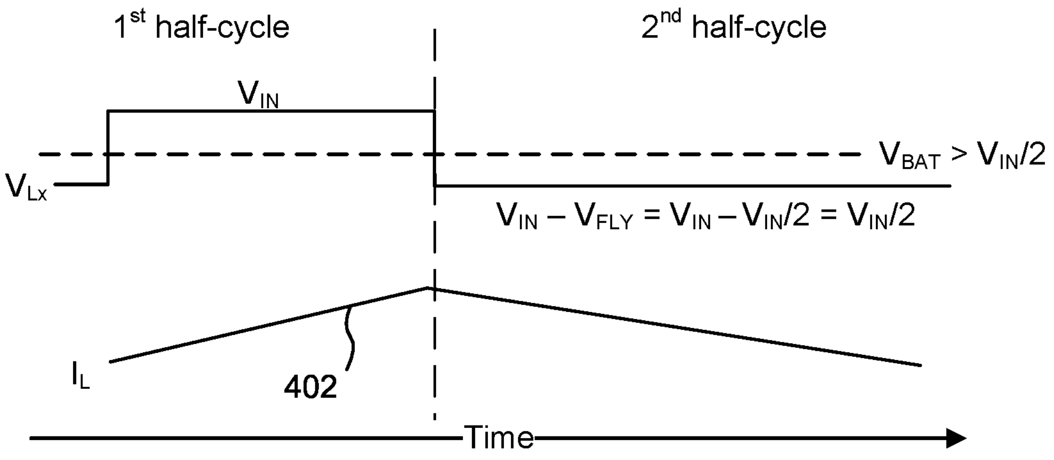
FIG. 4 is a combination graph of the voltage $V_{Lx}$ at node Lx and the current $I_L$ through inductor L versus time during the first and second halves of a charging cycle for fly capacitor $C_{F1}$ while $V_{BAT}>V_{IN}/2$ and $V_{FLY}=V_{IN}/2$.

FIG. 4 is a combination graph 400 of the voltage $V_{Lx}$ at node Lx and the current $I_L$ through inductor L versus time during the first and second halves of a charging cycle for fly capacitor CHI While $V_{BAT}>V_{IN}/2$ and $V_{FLY}=V_{IN}/2$ (i.e., the target voltage level). As graph line 402 indicates, the current $I_L$, increases during the first half of the charging cycle and decreases during the second half of the charging cycle. Operation of the 3-level converter cell is as desired.

Figure 5:
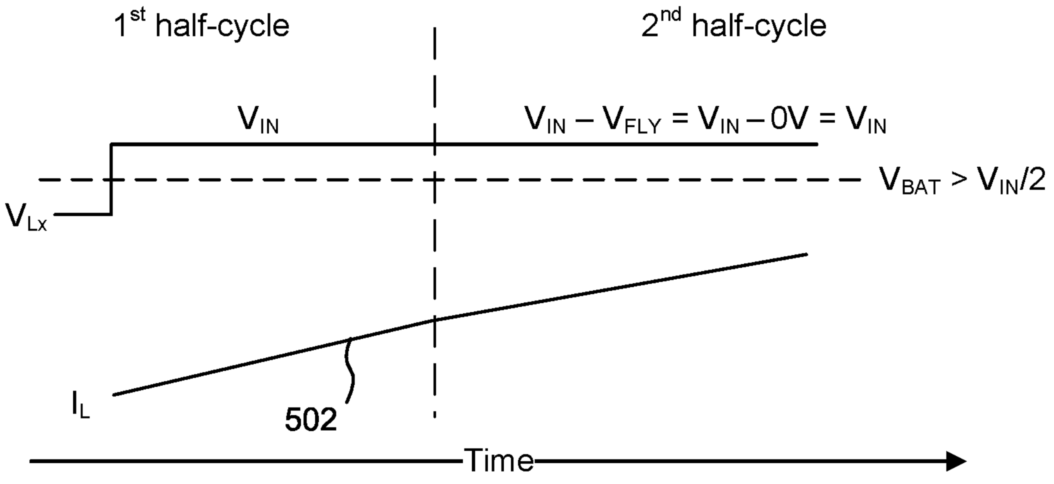
FIG. 5 is a combination graph of the voltage $V_{Lx}$ at node Lx and the current $I_L$ through inductor L versus time during the first and second halves of a charging cycle for fly capacitor $C_{F1}$ while $V_{BAT}>V_{IN}/2$ and $V_{FLY}=0V$.

FIG. 5 is a combination graph 500 of the voltage $V_{Lx}$ at node Lx and the current $I_L$ through inductor L versus time during the first and second halves of a charging cycle for fly capacitor $C_{F1}$ while $V_{BAT}>V_{IN}/2$ and $V_{FLY}=0V$ (i.e., far from the target voltage level). As graph line 502 indicates, because fly capacitor $C_{F1}$ has no charge ($V_{FLY}=0V$), node Lx stays at $V_{IN}$ during the second half of the charging cycle. Therefore, the inductor L will have positive voltage across it all the time, causing current to build in it and eventually reach an over-current limit. The problem extends to other classes of M-level converter cells (e.g., 4-level and 5-level converter cells).

Accordingly, in a 3-level converter cell, fly capacitor $C_{F1}$ should be pre-charged so that $V_{FLY}=V_{IN}/2$ before multi-level switching starts and $V_{FLY}$ should be maintained at that same level during switching. One approach to pre-charging $V_{FLY}$ might be to add circuitry such as current mirrors to an M-level converter to pre-charge each fly capacitor to a suitable target voltage (e.g., $V_{IN}/2$ for a 3-level converter cell) before normal switching operation commences. However, if the power up time is a critical specification, then the pre-charging current required is higher and the current mirrors would consume a large area of an integrated circuit (IC). For example, to charge a 20 μF fly capacitor $C_{F1}$ to 10V in 10 mS requires a 20 mA current (i=c*dv/dt). If IC die area is a critical specification, then the pre-charging current value can be smaller, but power-up time will increase. For example, the time to charge a 20 μF fly cap to 10V with a 1 mA current is 200 mS.

Rather than add a large area of circuitry to pre-charge the fly capacitors of an M-level converter cell (keeping in mind that such circuitry is not used for anything else after startup), the present disclosure teaches a new and fast pre-charging technique that may be implemented in a smaller area than conventional solutions. As one example, FIG. 6A is a block diagram of an improved 3-level converter cell 600 in accordance with the present invention.

Figure 6A:
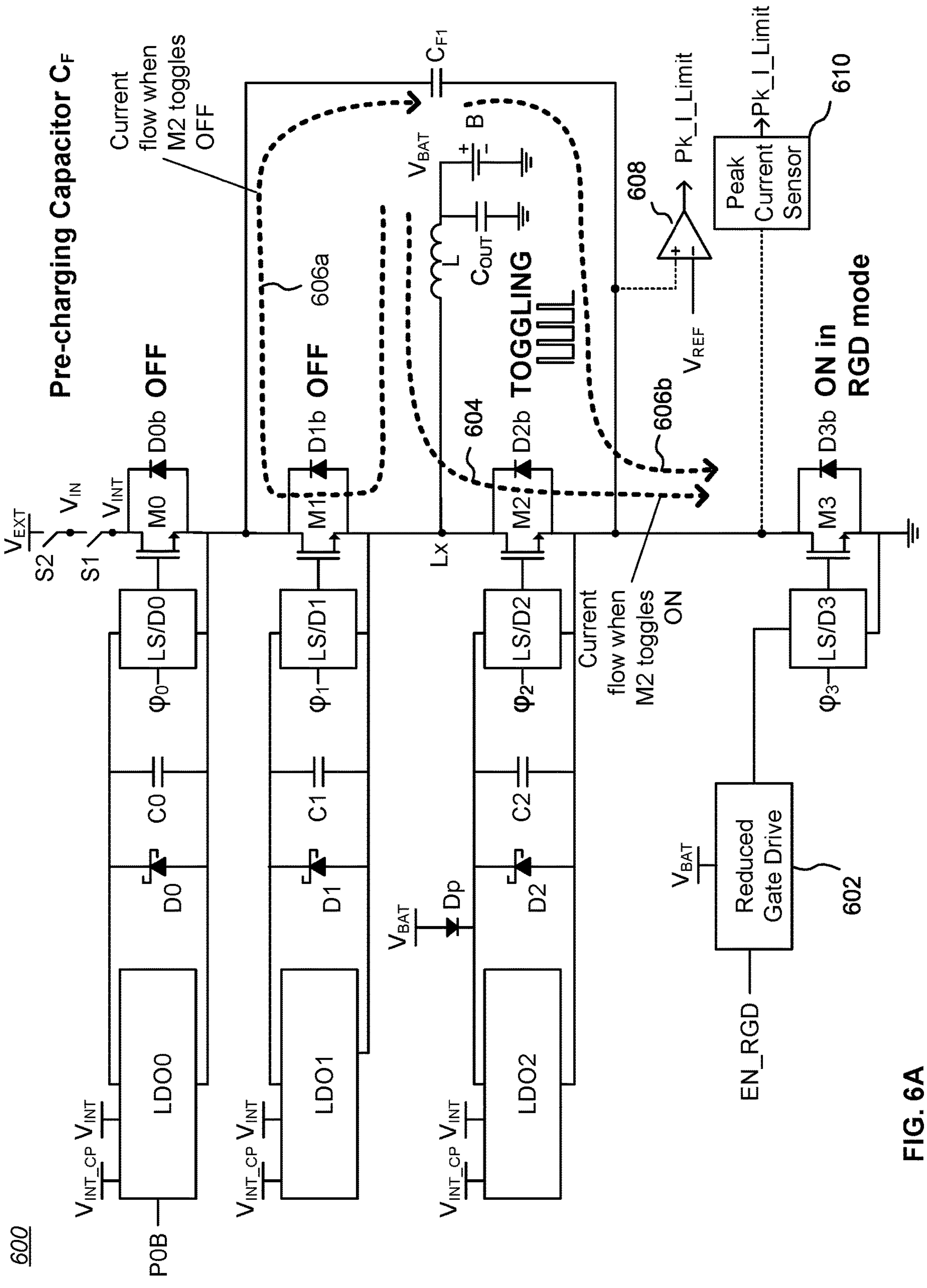
FIG. 6A is a block diagram of an improved 3-level converter cell in accordance with the present invention.

In FIG. 6A, power field-effect transistors (FETs) M0-M3 have their conduction channels (drain-to-source) coupled in series between an internal voltage node $V_{INT}$ and a reference potential (e.g., circuit ground). The internal voltage node $V_{INT}$ is coupled by an internal disconnect switch S1 to a $V_{IN}$ node, which in turn is coupled by an external disconnect switch S2 to an external voltage source $V_{EXT}$, such as a wired charging source (e.g., USB) or a wireless charging source. The voltage at node $V_{INT}$ is essentially the voltage at node $V_{IN}$ after passing through the disconnect switch S1, while the voltage at node $V_{IN}$ is essentially the voltage at node $V_{EXT}$ after passing through the disconnect switch S2. The disconnect switches S1, S2 allow the power FETs M0-M3 to be isolated from the $V_{EXT}$ voltage source until the converter cell 600 is ready for normal switching operation. Note that in the description below, "$V_{IN}$" and "$V_{INT}$" may be used to refer to a node or to the voltage at that node, depending on context.

Figure 7:
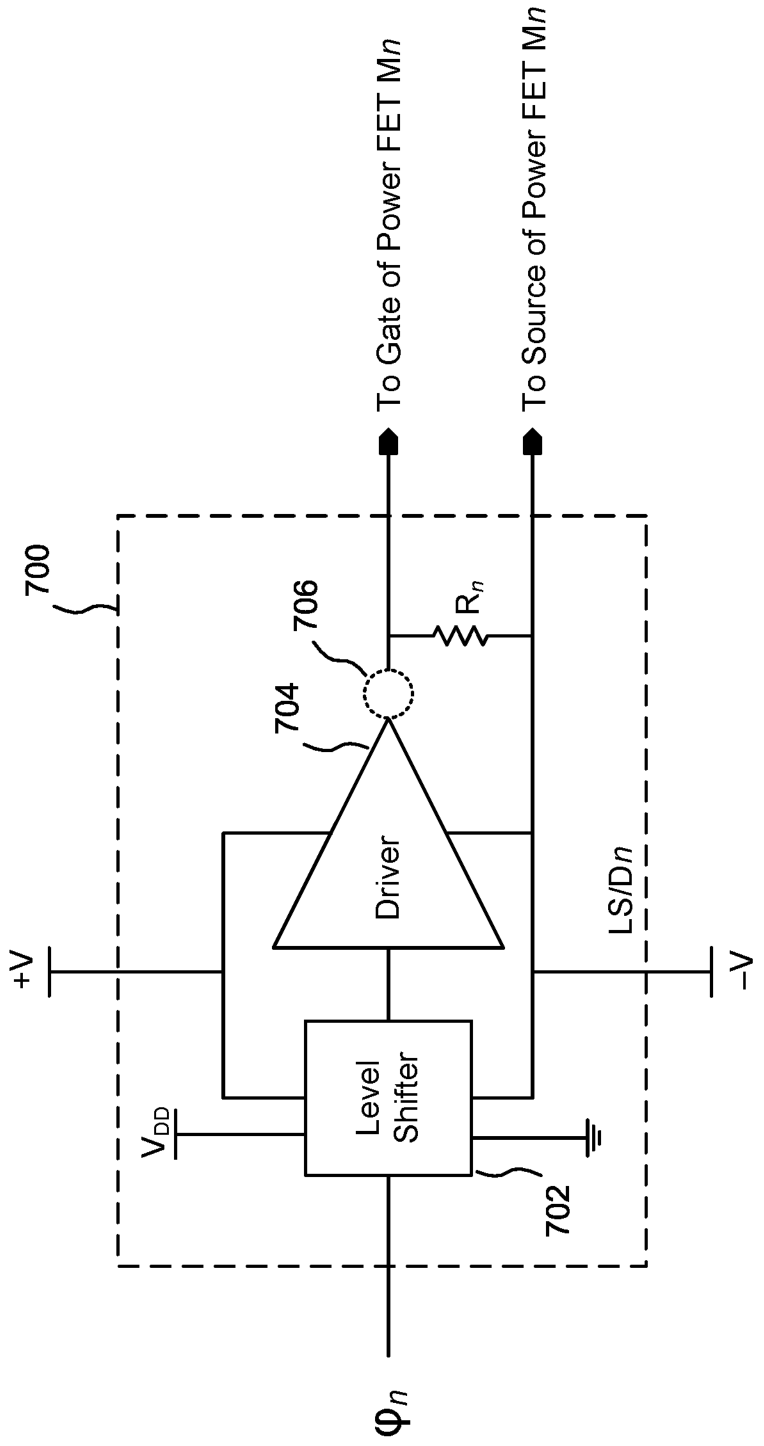
FIG. 7 is a schematic diagram of a level shifter/driver circuit which may be used with the converter cell of FIG. 6A.

Each power FET M0-M3 is shown with a respective inherent body diode D0*b*-D3*b* connected in parallel with the associated FET. The gate of each power FET Mn is coupled to a corresponding level shifter/driver circuit LS/Dn, one example of which is shown in FIG. 7. Note that in some embodiments, the outermost low-side power FET (M3 in this example) may not need a level shifter, but only a driver circuit; however, if the clocking signal φ3 is in a different voltage domain than $V_{BAT}$, the clocking signal 43 needs to be level shifted to the $V_{BAT}$ voltage domain before applying it to the gate of power FET M3. Clocking signals $\varphi_0$-$\varphi_3$ from a controller (see, e.g., FIG. 11) applied to respective level shifter/driver circuits LS/D1-LS/D3 control the ON (conducting) or OFF (blocking) state of the power FETs M0-M3.

Figure 8:
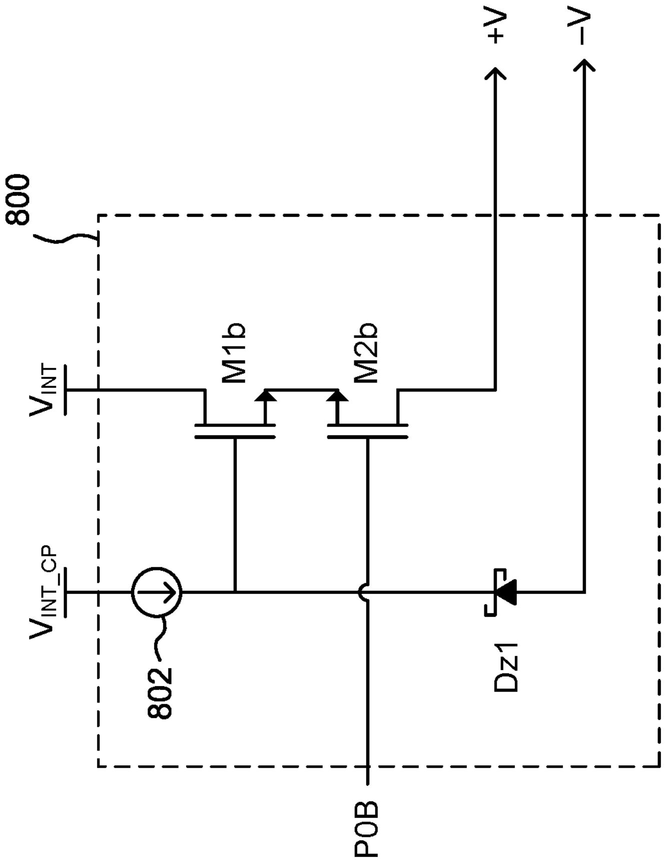
FIG. 8 is a schematic diagram of an example low-dropout (LDO) circuit which may be used for the low-dropout circuits LDOn with the converter cell of FIG. 6A.
Figure 9:
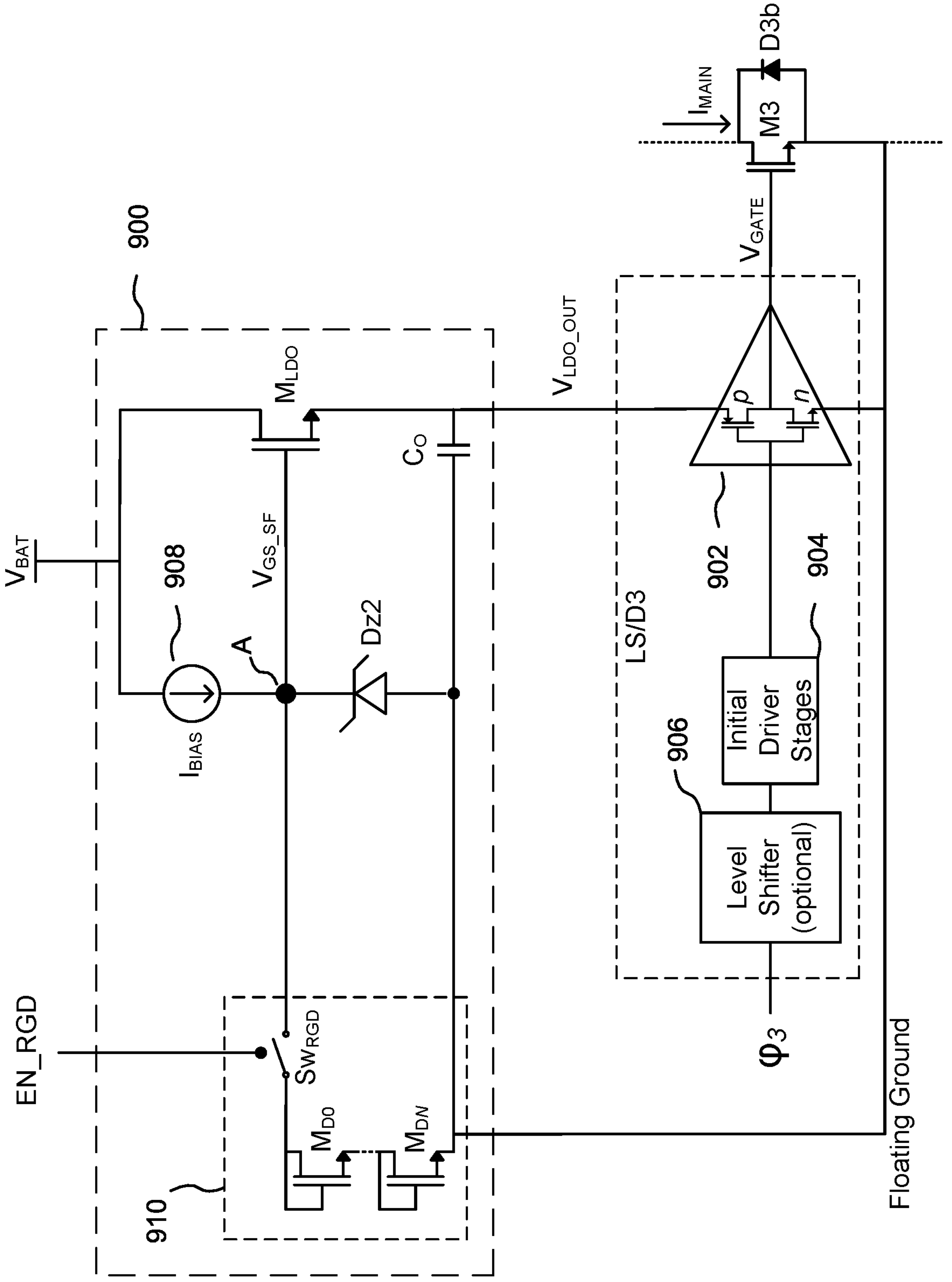
FIG. 9 is a schematic diagram of an example RGD circuit that may be used to power at least part of the outermost low-side level shifter/driver circuit LS/D3 of FIG. 6A.

The level shifter/driver circuits LS/D0, LS/D1, and LS/D2 are coupled in parallel with respective boot capacitors Cn and optional protective Zener diode clamps Dn and are coupled to the output of respective low-dropout circuits LDO0, LDO1, and LDO3, one example of which is shown in FIG. 8. The outermost low-side level shifter/driver circuit LS/D3 is coupled to the output of a reduced gate drive circuit (RGD) 602, one example of which is shown in FIG. 9. In the illustrated example, the innermost low-side level shifter/driver circuit LS/D2 is coupled to $V_{BAT}$ through a diode Dp to provide sufficient power to actuate power FET M2 while $V_{INT}=0V$.

In the illustrated example, an energy-storage inductor L is coupled between a battery B and a node Lx which separates the high-side power FETs M0, M1 from the low-side power FETs M2, M3. The voltage across the battery B is $V_{BAT}$. An output capacitor $C_{OUT}$ is coupled between the inductor L and a reference potential. An energy-storage fly capacitor $C_{F1}$ is coupled between a high-side node (between power FETs M0 and M1) and a low-side node (between power FETs M2 and M3).

An important aspect of the invention is the concept of building the current in the inductor L from the battery B (or from an output capacitor $C_{OUT}$ having sufficient charge available) and then transferring that current in a controlled way to pre-charge one or more fly capacitors through the inherent body diodes of the power FETs. Thus, for a 3-level power converter, with low-side power FET M3 always ON in a current-limiting reduced gate drive mode, when low-side power FET M2 is toggled ON, current from $V_{BAT}$ flows through the inductor L to circuit ground through a low-resistance path provided by power FETs M2 and M3. Accordingly, energy is stored in the inductor L. When the current through the inductor L is detected to have reached a specified threshold level, power FET M2 is toggled OFF. The energy stored in the inductor L is then transferred to the fly capacitor CHI through the inherent body diode D1*b* of power FET M1. No current flows through the inherent body diode D1*b* of power FET M1 when M2 is ON because the resistance of the current path through power FETs M2 and M3 to circuit ground is less than the forward threshold voltage of the body diode D1*b*. Repeatedly toggling power FET M2 ON and OFF allows incremental quantities of current to build up in the inductor L and then be transferred to the fly capacitor $C_{F1}$ until a target voltage (e.g., $V_{IN}/2$ for fly capacitor $C_{F1}$) is reached on each fly capacitor. Importantly, the current through inductor L and the charging current to the fly capacitor CHI is limited by the reduced gate drive mode of the outermost low-side power FET (power FET M3 in this 3-level power converter example), thus protecting the circuit components from over-current damage.

In more general detail, embodiments of the present invention utilize the power available from the battery B connected to an M-level converter cell and operate a converter cell in a boost mode (non-synchronous, meaning before normal switching commences, with low-side power FETs switching ON and OFF, but high-side power FETs set to OFF; the body diodes of the high-side power FETs help in ramping down inductor current) to repeatedly transfer charge from the battery to one or more fly capacitors $C_{Fx}$ until a respective target voltage is reached for each fly capacitor. For example, all of the fly capacitors $C_{Fx}$ of an M-level power converter may be pre-charged using the following process for power FET state configurations (note that for 4-level and above power converters, all fly capacitors should be initially discharged so as to start from 0V):

a. for the duration of pre-charging, the outermost low-side power FET (i.e., closest to the reference potential, which is power FET M3 in this example) is set to a current-limiting reduced gate drive (RGD) mode (see FIG. 9 for details of the RGD mode and implementing circuitry);

b. all of the high-side power FETs (M0 and M1 in this example) are set to an OFF state;

c. all low-side power FETs except the innermost low-side power FET are set to an ON state (there are no other FETs in this 3-level example), which may be at a full gate drive or at a reduced gate drive;

d. the innermost low-side power FET (i.e., closest to node Lx, which is M2 in this example) is set to toggling (cyclically switching between ON and OFF states, possibly with different duty cycles), which commences charging all of the fly capacitors $C_{Fx}$ from charge periodically stored in the inductor L;

e. toggling of the innermost low-side power FET continues until an associated fly capacitor is fully pre-charged to a respective target voltage level; and f. if any remaining fly capacitors $C_{Fx}$ need to be fully pre-charged, a next low-side power FET, further from node Lx, is selected for toggling along with the previously toggling low-side power FET or FETs until a fly capacitor associated with that next low-side power FET is fully pre-charged. By toggling the power FET associated with a fully pre-charged fly capacitor, that capacitor is floating whenever the associated power FET is in an OFF state, thus preserving that capacitor's charge while charge flows from the inductor L to other fly capacitors. This step repeats until all fly capacitors are fully pre-charged to respective target voltage levels.

Once full pre-charging of all fly capacitors has occurred, the M-level converter cell can continue any additional startup procedures that may be needed and normal switching operation may commence, with the converter cell 600 configured for either boost or buck operation as may be needed for a particular application or situation.

Referring again to FIG. 6A, when pre-charging the fly capacitor $C_{F1}$, the states of the power FETs M0-M3 are shown in bold type next to each power FET and would be set by appropriate values of clocking signals $\varphi_0$-$\varphi_3$: M0 and M1 are OFF, M2 is toggling, and M3 is ON in a current-limiting RGD mode. Note that the level shifter/driver circuit LS/D2 for toggling power FET M2 is powered by $V_{BAT}$ (through diode Dp) during this phase of operation. Similarly, the RGD circuit 602 is powered by $V_{BAT}$, thus allowing power FET M3 to be turned ON in the RGD mode. Dotted line 604 shows the flow of charge from $V_{BAT}$ through the inductor L and node Lx and on through power FETs M2 and M3 to the reference potential (e.g., circuit ground) when power FET M2 toggles to an ON state. Dotted lines 606*a* and 606*b* respectively show the flow of charge from $V_{BAT}$ through the inductor L and node Lx and on through the inherent body diode D1*b* of power FET M1 to the top plate of the fly capacitor CHI and from the bottom plate of the fly capacitor $C_F$1 through always-ON power FET M3 to the reference potential when power FET M2 toggles to an OFF state.

In some embodiments, in order to ensure a known startup-state, it may be useful to discharge the $V_{INT}$ and $V_{IN}$ nodes to a target voltage level before coupling an external voltage VENT source (e.g., USB or wireless charging circuitry) to the $V_{IN}$ node. The target voltage level may be 0V, but in order not to waste stored energy and thus increase the efficiency of the converter cell 600, the target voltage level may be set to be no more than $V_{BAT}$. For example, the $V_{INT}$ and $V_{IN}$ nodes may be at some unknown voltage, such as somewhere between 5V and 6V, while $V_{BAT}$ may be 3V. Discharging $V_{INT}$ and $V_{IN}$ to about $V_{BAT}$ results in a known voltage at those nodes.

For similar reasons, if all fly capacitors $C_{Fx}$ are over-charged, it may be useful in some embodiments (particularly multi-level power converters having more than 3-levels) to discharge the over-charged fly capacitors $C_{Fx}$: to a respective target voltage level (in which case, pre-charging is unnecessary).

In alternative embodiments, such as where suitable power supplies are available to energize the gate-side control circuitry for the high-side power FETs at startup, then one or more high-side power FETs (e.g., M1 in the example of FIG. 6A) may be turned ON to transfer charge from the inductor L (as initially provided by $V_{BAT}$) to the fly capacitors for pre-charging purposes, rather than using the body diodes of the high-side power FETs. For example, high-side power FET M1 may be toggled in opposite phase with respect to low-side power FET M2 so that charge is transferred from the inductor L through the source-drain conduction channel of power FET M1 to fly capacitor $C_{F1}$. In higher order multi-level power converters, after fly capacitor $C_{F1}$ is fully charged, power FET M1 and a next higher high-side power FET may be toggled in opposite phase with respect to the next toggling low-side power FET so that charge is transferred from the inductor L through the source-drain conduction channels of the high-side power FETs to the next fly capacitor $C_{Fx}$. In general, the process steps outlined above for body diode-based charge transfer would be the same, except that the high-side power FETs would be toggled as described rather than turned OFF.

Figure 6B:
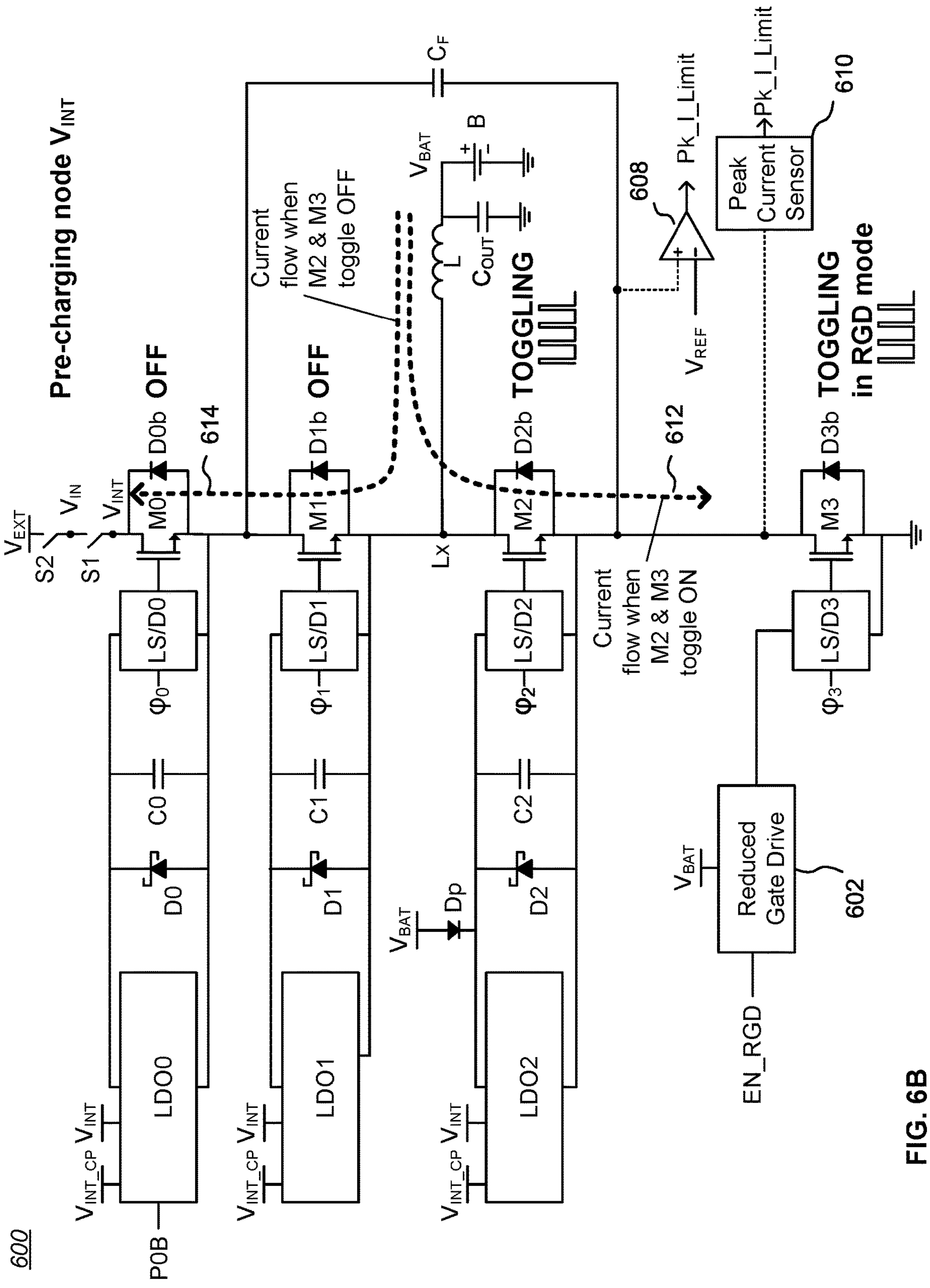
FIG. 6B is a block diagram of the improved 3-level converter cell in a second pre-charging configuration.

In some embodiments, after discharging the $V_{INT}$ and $V_{IN}$ nodes to a known target voltage (e.g., $V_{BAT}$), it may be useful to pre-charge the $V_{INT}$ and $V_{IN}$ nodes back up to a desired voltage level that will be at or close to the expected voltage for the external voltage VENT source (e.g., about 4.8V). In such a case, a variation of the technique described above for pre-charging the fly capacitor $C_{F1}$ may be used. For example, FIG. 6B is a block diagram of the improved 3-level converter cell 600 in a second pre-charging configuration. When pre-charging the $V_{INT}$ and $V_{IN}$ nodes, the states of the power FETs M0-M3 are shown in bold type next to each power FET and would be set by appropriate values of clocking signals $\varphi_0$-$\varphi_3$: M0 and M1 are OFF, M2 is toggling, and M3 is either ON or toggling in synchrony with M2 but in either case operating in a current-limiting RGD mode. Dotted line 612 shows the flow of charge from $V_{BAT}$ through the inductor L and node Lx and on through power FETs M2 and M3 to the reference potential when power FETs M2 and M3 are in an ON state. Dotted line 612 shows the flow of charge from $V_{BAT}$ through the inductor L and node Lx and on through the respective inherent body diodes D1*b* and D0*b* of power FETs M1 and M0 to the $V_{INT}$ node when power FET M2 toggles to an OFF state. If switch S1 is closed, then charge is also conveyed to the $V_{IN}$ node—the voltage on the $V_{INT}$ and $V_{IN}$ nodes will essentially equalize.

One process for pre-charging the $V_{INT}$ and $V_{IN}$ nodes may be summarized as follows:

a. the outermost low-side power FET is set to a current-limiting reduced gate drive mode;

b. all of the plurality of high-side power FETs are set to an OFF state; and c. all of the plurality of low-side power FETs are set to toggling to commence charging the $V_{INT}$ node (and the $V_{IN}$ node if switch S1 is closed), and to continuing toggling until the $V_{INT}$ node (and the $V_{IN}$ node if switch S1 is closed) is fully pre-charged to a target voltage level.

Figure 6C:
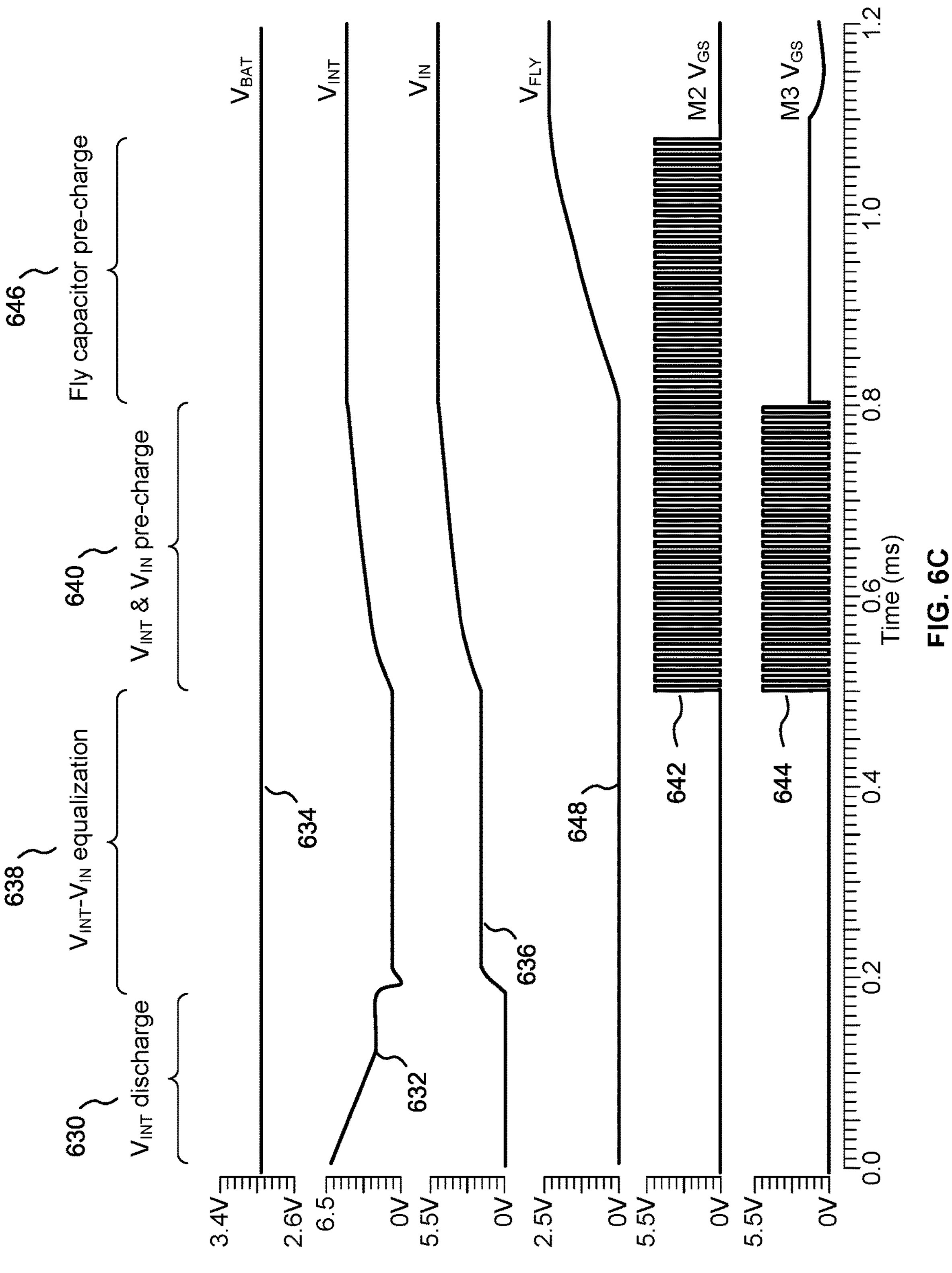
FIG. 6C is a graph showing voltages of different nodes of the converter cell of FIG. 6A as a function of time during a particular start-up sequence for the converter cell.

FIG. 6C is a graph showing voltages of different nodes of the converter cell 600 of FIG. 6A as a function of time during a particular start-up sequence for the converter cell 600.

During time span 630, if node $V_{INT}$ is over-charged, then node $V_{INT}$ (graph line 632) is discharged to a target voltage level, such as $V_{BAT}$ (graph line 634; $V_{BAT}$ is at a constant 3V in this example). Optionally, in some embodiments, node $V_{IN}$ (graph line 636) may be discharged as well (in this example, node $V_{IN}$ is already at 0V).

During time span 638, nodes $V_{INT}$ and $V_{IN}$ are connected by closing disconnect switch S1, thus essentially equalizing the voltages at the two nodes.

During time span 640, node $V_{INT}$ (and consequently node $V_{IN}$ as well) is pre-charged to a target voltage level (4.8V in this example) by setting the converter cell 600 to the second pre-charging configuration shown in FIG. 6B. Accordingly, the gate voltages $V_{GS}$ for the gates of power FET M2 (graph line 642) and power FET M3 (graph line 644) begin toggling between ON and OFF states, causing the voltages at nodes $V_{IN}$ and $V_{INT}$ to ramp up to about the target voltage level. Note that the frequency of graph lines 642 and 644 is not to scale—the actual ON-OFF cycle would generally be much higher in frequency than is depicted in the drawing.

During time span 646, if the fly capacitor $C_{F1}$ is not over-charged, then the level converter cell 600 is set to the first pre-charging configuration shown in FIG. 6A to pre-charge the fly capacitor $C_{F1}$ to $V_{IN}/2$. Accordingly, power FET M2 continues toggling between ON and OFF states, but power FET M3 stops toggling and instead enters a steady current-limited (RGD mode) ON state. During time span 646, the voltage across the fly capacitor $C_{F1}$ (graph line 648) begins to ramp up to $V_{IN}/2$ (about 2.32V in this example) while power FET M2 is toggling. When the voltage across the fly capacitor CHI reaches about $V_{IN}/2$, the power FET M2 reverts back to an OFF state, ending time span 646. Any remaining steps in the startup sequence for the converter cell 600 may proceed, after which normal switching operation of the converter cell 600 may commence.

Some start-up sequences may include a step for discharging the fly capacitors CE to a known voltage state before commencing pre-charging, which is generally necessary for multi-level power converters having more than 3-levels (and thus having more than one fly capacitor).

Figure 6D:
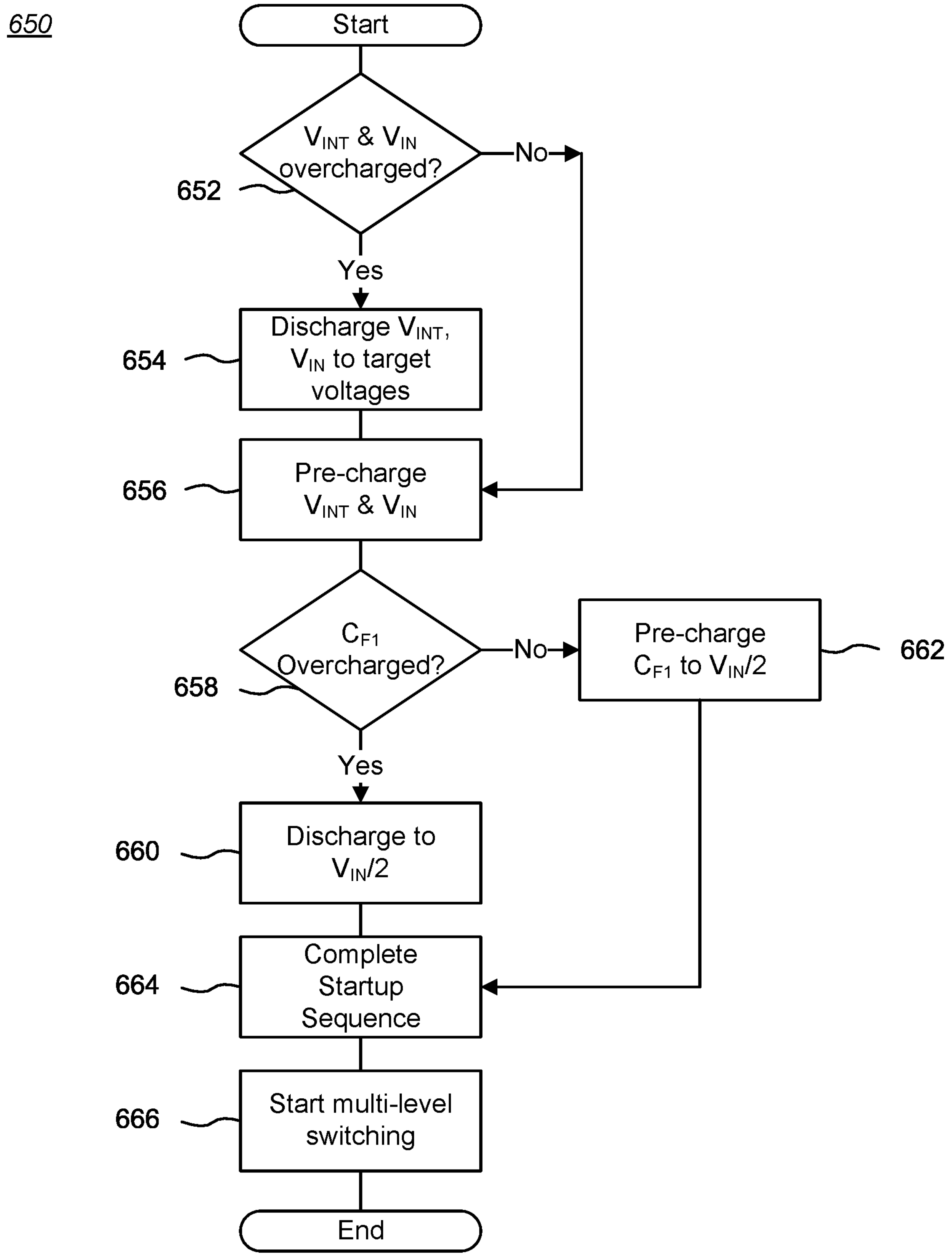
FIG. 6D is a first flow-chart the illustrates another start-up sequence for pre-charging the $V_{IN}$ and $V_{INT}$ nodes and then pre-charging the single fly capacitor $C_{F1}$ of a 3-level power converter.

FIG. 6D is a first flow-chart 650 the illustrates another start-up sequence for pre-charging the $V_{IN}$ and $V_{INT}$ nodes and then pre-charging the single fly capacitor $C_{F1}$ of a 3-level power converter. The process generally follows the sequence of actions described above with respect to FIG. 6C. In detail, if the $V_{INT}$ and $V_{IN}$ nodes are determined to be overcharged (step 652), then both are discharged to target voltages, such as $V_{BAT}$ (step 654), otherwise (and in any case) both nodes are pre-charged using the circuit configuration shown in FIG. 6B (step 656).

In the illustrated example, if the fly capacitor CHI is determined to be overcharged (step 658), then the fly capacitor $C_{F1}$ is discharged to $V_{IN}/2$ (step 660), otherwise the fly capacitor $C_{F1}$ is pre-charged using the circuit configuration shown in FIG. 6A (step 662). In any case, the startup sequence continues to completion (step 664) and multi-level switching may start (step 666).

Figure 6E:
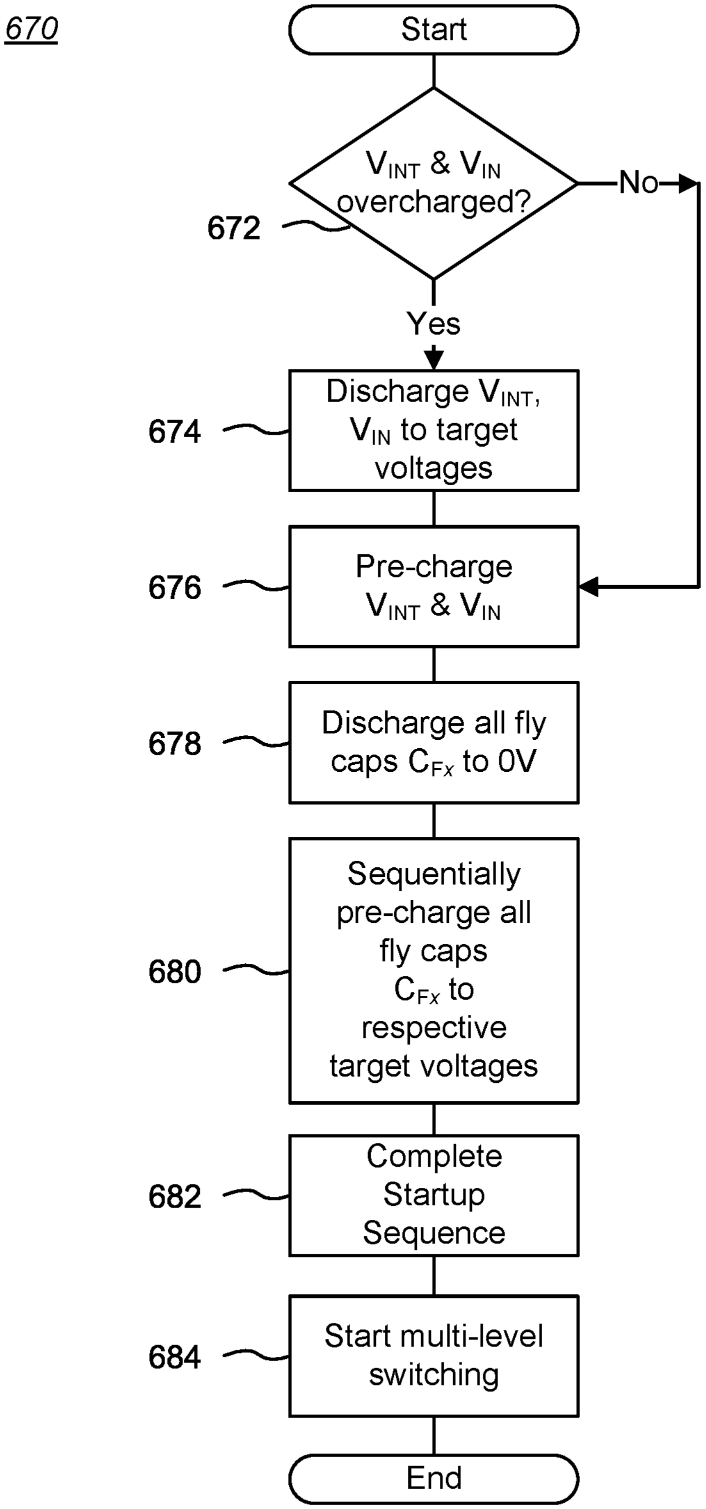
FIG. 6E is a second flow-chart the illustrates steps for pre-charging the $V_{IN}$ and $V_{INT}$ nodes and then pre-charging the multiple fly capacitors $C_{Fx}$ of a power converter cell of level 4 or higher.

FIG. 6E is a second flow-chart 670 the illustrates steps for pre-charging the $V_{IN}$ and $V_{INT}$ nodes and then pre-charging the multiple fly capacitors CH of a power converter cell of level 4 or higher. In detail, if the $V_{INT}$ and $V_{IN}$ nodes are determined to be overcharged (step 672), then both are discharged to target voltages, such as $V_{BAT}$ (step 674), otherwise (and in any case) both nodes are pre-charged using the circuit configuration shown in FIG. 6B (step 676).

In the illustrated example, all fly capacitors $C_{Fx}$ are discharged to 0V to ensure a known voltage state before commencing pre-charging (step 678), The fly capacitors CH are then sequentially pre-charged using the circuit configuration shown in FIG. 6A (step 680). Thereafter, the startup sequence continues to completion (step 682) and multi-level switching may start (step 684).

It should be appreciated that other start-up sequences may be used that include fewer or more sequence events.

In multi-level power converters in which the target voltage for one or more fly capacitors is actually less than $V_{BAT}$, a different switch configuration may be used that bypasses the need for repeated pumping of charge into the inductor L and then discharging into a fly capacitor. For example, referring to FIG. 6A, if the target voltage for fly capacitor $C_{F1}$ is $V_{IN}/2$ and $V_{BAT}>V_{IN}/2$, then the following switch states may be set by appropriate values of clocking signals $\varphi_0$-$\varphi_3$: M0 is OFF, M1 is OFF (but may be ON if sufficient power is available to activate the gate-side control circuitry for M1), M2 is OFF, and M3 is ON in a current-limiting RGD mode. Charge would then transfer directly from $V_{BAT}$ to fly capacitor CHI through the inherent body diode D1*b* or the conduction channel of M1, with the current limited by power FET M3. When the voltage across fly capacitor CHI is measured to be $V_{IN}/2$, then power FET M3 is turned OFF, thus floating the bottom plate of fly capacitor CHI and preventing further charging.

As noted above, when the toggling power FET begins an ON state half-cycle, the current in inductor L ramps up. In order to protect the inductor L from an over-current situation, an optional peak current sensor may be used to determine when to end the ON duration of a toggling low-side power FET or FETs. A peak current sensor may be voltage based or current based.

For example, referring to FIG. 6A, one type of peak current sensor might be a voltage comparator 608 having a first input coupled to the bottom plate of fly capacitor $C_{F1}$ (see dotted line, indicating the optional status of the voltage comparator 608) and a second input coupled to a reference voltage $V_{REF}$. When toggling power FET M2 is ON and the current through the inductor L starts increasing above the value limited by the RGD power FET M3, the difference current starts flowing into the bottom plate of fly capacitor CHI and sharply raises the voltage on the bottom plate of fly capacitor $C_{F1}$. That causes a difference between the bottom plate voltage and $V_{REF}$, triggering an output of the comparator 608, Pk_I_Limit, that may be provided to a control system and used to toggle power FET M2 OFF. A similar comparator-based peak current sensor may be used for each fly capacitor in other classes of M-level converter cells (e.g., 4-level and 5-level converter cells).

Figure 10:
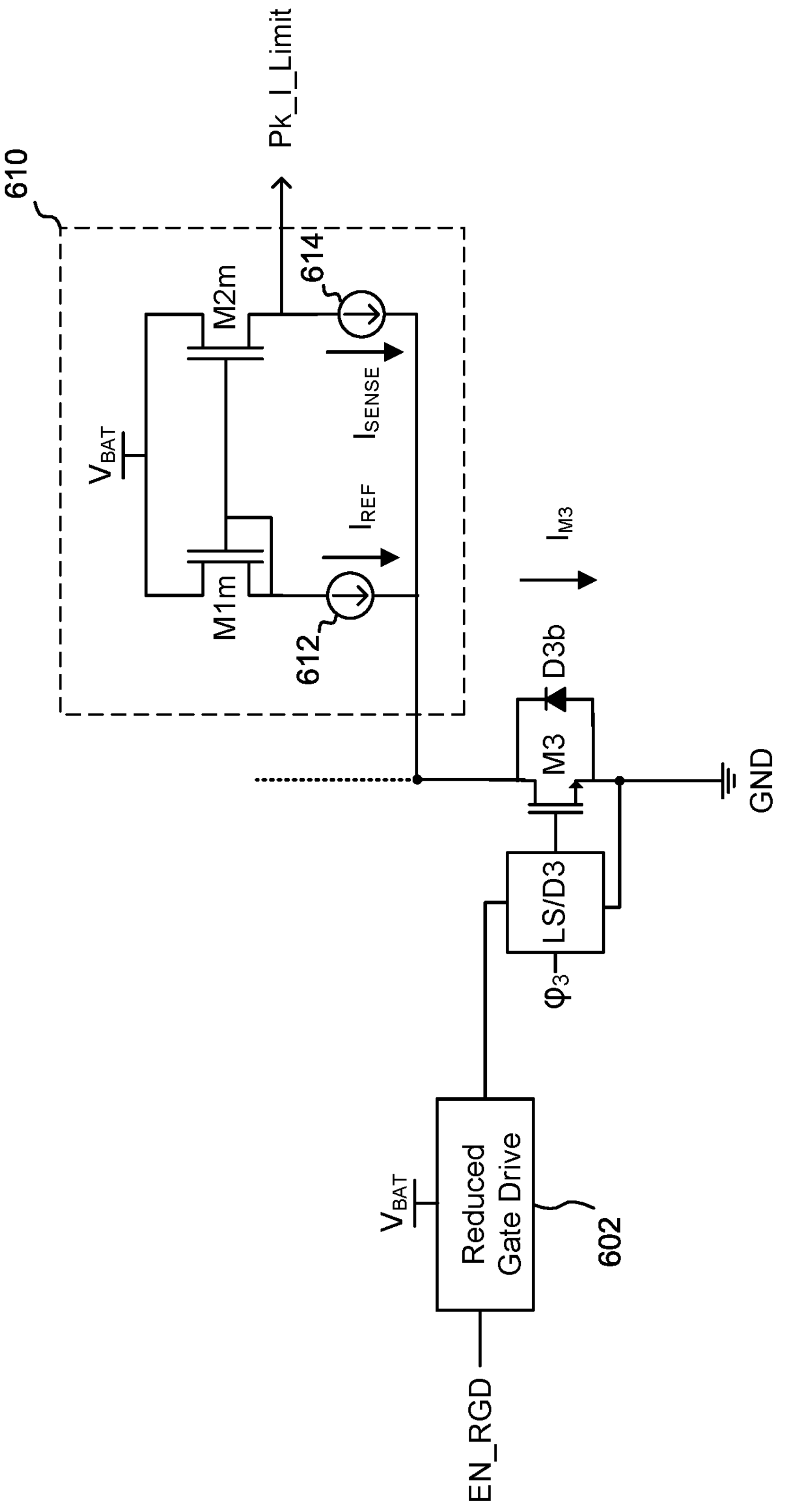
FIG. 10 is a schematic diagram of one embodiment of the peak current sensor of FIG. 6A.

FIG. 6A also shows an alternative implementation of an optional peak current sensing in the form of a peak current sensor 610 coupled to a node above the outermost low-side power FET (M3 in this example). As the current through the outermost low-side power FET increases, that current can be sensed and compared against a fixed reference to generate a control signal Pk_I_Limit that may be provided to a control system and used to toggle power FET M2 OFF. Details of one embodiment of the peak current sensor 610 are shown in FIG. 10.

FIG. 7 is a schematic diagram of a level shifter/driver circuit 700 which may be used with the converter cell of FIG. 6A. An input clock signal $\varphi_n$ is applied to the input of a level shifter 302 that has first power inputs coupled between a general system supply voltage $V_{DD}$ and circuit ground and second power inputs coupled between a local voltage +V, −V representing the potential across an associated boot capacitor Cn; the −V power input thus represents a local reference potential which is also coupled the source of the associated power FET Mn. The level shifter 702 translates an input signal from one voltage domain (e.g., digital logic voltages) to another voltage domain (e.g., transistor control voltages). The output of the level shifter 702 thus follows the input clock signal $\varphi_n$ but in a different voltage range.

The output of the level shifter 702 is applied to the input of a driver 704 that has power terminals coupled to the local voltage +V, −V. The driver 704 may have either a non-inverting or an inverting output (as indicated by the dotted circle 706) that is coupled to the gate of an associated power FET Mn (noting that the high-side power FETs and the low-side power FETs generally receive complementary control clock signals during synchronous operation, hence the need for the different output polarities). In some embodiments, the driver 704 may comprise one or more inverters or buffers, and the number of constituent inverters and/or buffers within the driver 704 may be adjusted to accommodate signal delay requirements of a particular application. In general, it is useful to design the driver 704 so that it may be placed into a high impedance (high-Z) output state.

An optional resistor Rn may be coupled between the output of the driver 704 (and hence also to the gate of the associated power FET Mn) and the local reference potential (and hence also to the source of the associated power FET Mn). The resistor Rn preferably has a reasonably high resistance (e.g., 100 kΩ or more) that does not interfere with normal control of the associated power FET Mn by the LS/Dn circuit 700, but allows draining of charge from the gate of the associated power FET Mn to maintain that power switch in an OFF state. This capability is useful by creating a known system state (i.e., a default OFF state for power FET Mn) if the driver 704 is not fully powered and operational or if the corresponding LS/Dn circuit 700 is placed in a high-Z state.

As noted above, power to each LS/Dn circuit 700 is provided by charge stored on a corresponding bootstrap capacitor Cn (in this example, n=0 . . . 2) coupled to the +V, −V voltage inputs of the associated LS/Dn circuit 700. Each bootstrap capacitor Cn is preferably sized to provide at least sufficient charge, with minimal voltage drop, to allow the associated LS/Dn circuit 700 to switch the state of the associated power FET Mn (the control gates of which are relatively large capacitive structures). Generally, each bootstrap capacitor Cn loses charge in switching the gate of the associated power FET Mn. Further, the bootstrap capacitors Cn lose charge even when not switching an associated power switch, such as through DC current drain from other connected circuitry (e.g., bias currents for analog circuits). Accordingly, the bootstrap capacitors Cn generally need to be charged during startup and periodically recharged during normal operation to replenish lost charge.

FIG. 8 is a schematic diagram of an example low-dropout (LDO) circuit 800 which may be used for the low-dropout circuits LDOn with the converter cell of FIG. 6A. The LDO circuit 800 comprises a source follower (common drain) amplifier circuit that includes a regulated nFET M1*b* having its conduction channel coupled in series with the conduction channel of a second nFET M2*b*, with M1*b* and M2*b* being coupled between $V_{INT}$ and a +V output terminal. A current source 802 is coupled in series with a Zener diode Dz1 between a boosted voltage source $V_{INT\_CP}$ and a −V output terminal. In the illustrated example, $V_{INT\_CP}$ may be generated by a charge pump (not shown) coupled to $V_{INT}$ and is somewhat greater in magnitude than $V_{INT}$. A current source may be configured from transistors and/or diodes using a variety of circuits known in the art. The output of the current source 802 before the Zener diode Dz1 provides an essentially constant bias voltage to the gate of FET M1*b*. The bias current flows through the Zener diode Dz1 and ensures that the diode is always in reverse bias. The drain of the FET M1*b* provides a boot voltage to a local level shifter/driver circuit LS/Dn when FET M2*b* is set to an ON (conducting) state by a corresponding control signal POB from separate control logic, such as the controller circuitry 1100 in FIG. 11 below. FET M2*b* serves as a disconnect switch for the topmost high-side LDO. For lower LDOs, FET M2*b* supports electrostatic discharge currents through its body diode, and FET M2*b* may be configured as a diode-connected FET (that is, no control signal need be coupled to its gate).

FIG. 9 is a schematic diagram of an example RGD circuit 602 that may be used to power at least part of the outermost low-side level shifter/driver circuit LS/D3 of FIG. 6A. More specifically, at least the final driver 902 of LS/D3 is powered by the RGD circuit 602. The final driver 902 in this example includes a pFET and an nFET coupled in series in a conventional inverter configuration. In this example, the output of the final driver 902 is coupled to the gate of power FET M3. The input to the final driver 902 may comprise one or more initial driver stages 904. The input to the initial driver stages 904 may be from an optional level shifter 906 that receives a clocking signal $\varphi_3$ corresponding to power FET M3; if the level shifter 906 is omitted, the clocking signal $\varphi_3$ is applied directly to the initial driver stages 904.

In the illustrated example, the RGD circuit 602 includes a FET $M_{LDO}$ having its conduction channel coupled between $V_{BAT}$ and the final driver 902. The gate of FET $M_{LDO}$ is coupled to a node A. A principal function of the RGD circuit 602 is to enable at least two different voltage levels at Node A to be coupled to the gate of FET $M_{LDO}$, which in turn determines the output voltage level VGATE provided by the final driver 902 driving the gate of the associated power FET M3. The associated power FET M3 thus can be placed into (1) an overdriven or "full gate-drive" ON state having low $R_{ON}$ for normal power converter operation, or (2) at least one current-limiting reduced gate-drive ON state having a higher $R_{ON}$ and/or being in a saturation mode in which current is limited. Saturation mode looks like an increased resistance $R_{ON}$ but is not quite the same—in saturation mode, power FET M3 behaves like an ON-OFF switch that can only pass a maximum fixed current regardless of applied voltage, while a true resistance implies that a greater voltage allows a greater current. The current-limiting state is selected to provide protection against potentially damaging events (e.g., in-rush or charge transfer current). Potentially damaging events may occur, for example, during power converter startup, when balancing charge among fly capacitors within the power converter, or during fault events such as short circuit events.

The gate driver circuit for FET $M_{LDO}$ includes a current source 908 coupled in series with a Zener diode Dz2 between $V_{BAT}$ and a floating reference potential GND. The gate of FET $M_{LDO}$ is coupled to Node A between the current source 908 and the Zener diode Dz2. The output $I_{BIAS}$ of the current source 908 before the Zener diode Dz2 at Node A provides an essentially constant bias voltage $V_{GS\_SF}$ to the gate of FET $M_{LDO}$. The source of the FET $M_{LDO}$ provides a drive voltage $V_{LDO\_OUT}$ to the final driver 902.

In parallel with the Zener diode Dz2 is a voltage control circuit 910 comprising a reduced gated-drive switch $Sw_{RGD}$ series-coupled to a first diode-connected FET $M_{D0}$ and at least one additional diode-connected FET $M_{DN}$, where N≥1. As illustrated, one terminal of the switch $Sw_{RGD}$ is coupled to Node A and one terminal is connected to the conduction channel of the first diode-connected FET $M_{D0}$. The conduction channel of the first diode-connected FET $M_{D0}$ is coupled to the conduction channel of an additional diode-connected FET $M_{DN}$, with the conduction channel of the last additional diode-connected FET $M_{DN}$ being coupled to the floating reference potential GND. A control signal EN_RGD from a controller (e.g., see FIG. 11) controls the OPEN and CLOSED states of the switch $Sw_{RGD}$. Note that the switch $Sw_{RGD}$ may be positioned anywhere along the voltage control circuit 910 to interrupt or enable current flow through that circuit. For example, the order of switch $Sw_{RGD}$ and FETs $M_{D0}$ and $M_{DN}$ from Node A the floating reference potential GND may be (1) $Sw_{RGD}$, $M_{D0}$, $M_{DN}$ (as illustrated), (2) $M_{D0}$, $Sw_{RGD}$, $M_{DN}$, or (3) $M_{D0}$, $M_{DN}$, $Sw_{RGD}$. However, positioning the switch $Sw_{RGD}$ as shown in FIG. 9 may reduce parasitic influences on FET $M_{LDO}$ due, for example, to the capacitances of FETs $M_{D0}$ and/or $M_{DN}$. A decoupling capacitor $C_O$ is coupled between the source of FET $M_{LDO}$ and the floating reference potential GND.

A function of the diode-connected FET $M_{D0}$ is to offset FET $M_{LDO}$, since the threshold voltages of FET $M_{D0}$ and FET $M_{LDO}$ effectively cancel. A function of the additional diode-connected FETs $M_{DN}$ is to set the current $I_{MAIN}$ through power FET M3 in proportion to the ratio of the sizes of power FET M3 to FET $M_{DN}$ when switch $Sw_{RGD}$ is CLOSED and the current mirror function of the voltage control circuit 910 is engaged. More particularly, the current $I_{MAIN}$ through power FET M3 is proportional to the current $I_{BIAS}$ from the current source 908 and the size ratio of FET $M_{DN}$ to power FET M3. For example, if the current source 908 output is 1 mA, and power FET M3 is 1,000 times the size of FET $M_{DN}$ (W/L M3=1000×W/L $M_{DN}$), then the maximum current through power FET M3 is 1,000×1 mA=1A. This is achieved by ensuring the gate-to-source voltage $V_{GS}$ of FET $M_{DN}$ is the same as that of power FET M3. The maximum gate voltage of power FET M3 is the voltage at Node A minus the threshold voltage $V_{TH}$ of FET $M_{LDO}$. Including FET $M_{D0}$ increases the voltage at Node A by a second threshold voltage $V_{GS}$, so the voltage at Node A=($V_{GS}$ of FET $M_{DN}$)+($V_{TH}$ of FET $M_{D0}$), or $2V_{GS}$. If FET $M_{LDO}$ and FET $M_{D0}$ are matched (ratiometrically), then the maximum the $V_{GS}$ of power FET M3 can reach is the same as the $V_{GS}$ of FET $M_{DN}$, and this equality tracks over process, temperature, etc.

As noted above, an important function of the voltage control circuit 910 is that it provides a selectable amount of regulated gate bias voltage $V_{GS\_SF}$ to FET $M_{LDO}$, which in turn controls the power supply to, and voltage output of, the final inverter 902. When switch $Sw_{RGD}$ is OPEN, then the voltage control circuit 910 is disconnected from Node A—and therefore from the gate of FET $M_{LDO}$—and thus has essentially no effect on the output of FET $M_{LDO}$; accordingly, the final inverter 902 can overdrive the gate of power FET M3 to a selected level determined by the Zener diode Dz2.

When switch $Sw_{RGD}$ is CLOSED—such as during startup of the power converter when the outermost low-side power FET is configured in RGD mode during power up or precharging of fly capacitors, or when rebalancing charge amount fly capacitors—then the voltage control circuit 910 operates as a bypass to divert current around Zener diode Dz2 and lower the voltage at Node A, thus reducing the drive voltage to FET $M_{LDO}$. The reduced gate-drive voltage to FET $M_{LDO}$ in turn reduces the power to the final inverter 902 and thus reduces the gate-drive voltage VGATE to power FET M3. If the drain-source voltage $V_{DS}$ across power FET M3 is high enough to cause power FET M3 to be in saturation, then power FET M3 acts as a controlled current-limited source. If $V_{DS}$ is below the level that would cause power FET M3 to be in saturation, then power FET M3 should be in its linear range of operation with an increased $R_{ON}$ value compared to the $R_{ON}$ value when in a normal overdriven state. In either case-saturation-mode controlled current-limited source or linear-mode increased $R_{ON}$-power FET M3 should limit the current through the power FETs M0-M3 of the converter cell 600 and therefore inhibit excessive current spikes, thus protecting the power FETs (as well as other coupled circuitry) from large voltage spikes. Selectively varying the $I_{BIAS}$ current controls the value of VGATE applied to power FET M3, thus enabling selection of different increased values of $R_{ON}$.

It should be appreciated that while the RGD circuit 602 illustrated in FIG. 9 is preferred as simple to implement, requiring little power and circuit area, other devices or circuits that provide the same or similar function may be used in other embodiments. For example, Node A could be coupled through switch $Sw_{RGD}$ to an amplifier having a level-shifted reference voltage as an input; the gate voltage to FET $M_{LDO}$ would be more accurate but at the expense of complexity, circuit area, and power (and thus efficiency).

FIG. 10 is a schematic diagram of one embodiment of the current-based peak current sensor 610 of FIG. 6A. The peak current sensor 610 essentially comprises a current comparator that senses the power FET current and compares that sensed value against a fixed reference current. The example peak current sensor 610 includes (1) a FET M1*m* having a conduction channel coupled between $V_{BAT}$ and a first current source 612, which in turn is coupled to a reference potential GND, and (2) a FET M2*m* having a conduction channel coupled between $V_{BAT}$ and a second current source 614, which in turn is coupled to the reference potential GND. The gates of FETs M1*m* and M2*m* are coupled together and are also coupled to the source of FET M1*m*. The reference potential GND is coupled to the conduction channel of the outermost low-side power FET (M3 in this example) of the converter cell 600.

In operation, when power FET M2 is in an ON state, a current $I_{M3}$ flows through power FET M3 representing the current $I_L$ flowing through the inductor L. A reference current $I_{REF}$ flows through FET M1*m* and a mirrored sense current $I_{SENSE}$ flows through FET M2*m*. The sense current $I_{SENSE}$ is equal to $K*I_{M3}$, where K is a fractional scaling factor reflecting the relative device sizes of FET M2*m* and power FET M3. The peak current sensor 610 provides a control signal Pk_I_Limit at a node between power FET M2*m* and the second current source 614. The control signal Pk_I_Limit changes state (e.g., from high to low) when $I_{SENSE}$ equals $I_{REF}$, with $I_{REF}$ being set to a maximum (scaled) current limit for the amount of current that is permissible through inductor L. When generated, the control signal Pk_I_Limit may be provided to a control system and used to toggle power FET M2 OFF. Of note, only one peak current sensor 610 is needed to monitor the converter cell 600.

The current through the inductor L may be monitored by similar circuitry to control how long the power FET M2*m* is toggled OFF before toggling back to the ON state. It is generally desirable that little or no stored energy remain in the inductor L before toggling power FET M2*m* back ON, so it is preferable that power FET M2*m* be kept in the OFF state until the inductor current $I_L$ is zero or close to zero and only then toggle power FET M2*m* back ON.

Figure 11:
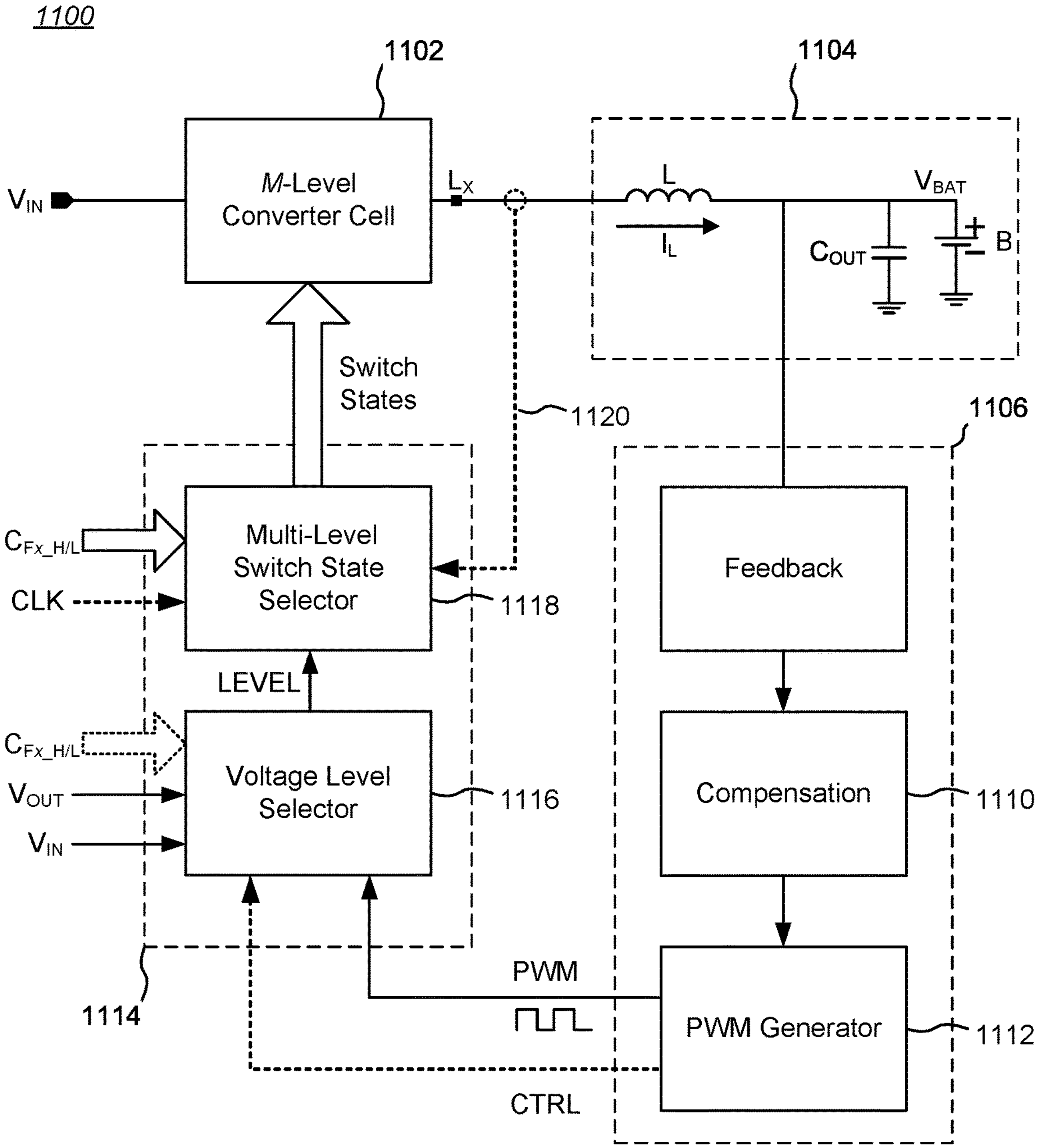
FIG. 11 is a block diagram of one embodiment of control circuitry for an M-level converter cell coupled to an output block comprising an inductor L and an output capacitor $C_{OUT}$.

FIG. 11 is a block diagram of one embodiment of control circuitry 1100 for an M-level converter cell 1102 coupled to an output block 1104 comprising an inductor L and an output capacitor $C_{OUT}$. Note that, conceptually, the inductor L also may be considered as being included within the M-level converter cell 1102, as in the examples of FIG. 6A. This example control circuitry 1100 is adapted from the teachings set forth in U.S. patent application Ser. No. 17/560,767, filed Dec. 23, 2021, entitled "Controlling Charge-Balance and Transients in a Multi-Level Power Converter", assigned to the assignee of the present invention, the contents of which are incorporated by reference. However, the present invention may be used in combination with other types of control circuitry for an M-level converter cell 1102.

The control circuitry 1100 functions as a control loop coupled to the output of the M-level converter cell 1102 and to power-switch control inputs of the M-level converter cell 1102. In general, the control circuitry 1100 is configured to monitor the output (e.g., voltage and/or current) of the M-level converter cell 1102 and dynamically generate a set of power-switch control inputs to the M-level converter cell 1102 that attempt to stabilize the output voltage and/or current at specified values, taking into account variations of $V_{IN}$ and output load. In alternative embodiments, the control circuitry 1100 may be configured to monitor the input of the M-level converter cell 1102 (e.g., voltage and/or current) and/or one or more internal nodes of the M-level converter cell 1102 (e.g., the voltage across one or more of fly capacitors or the current through one or more power FETs). Accordingly, most generally, the control circuitry 1100 may be configured to monitor the voltage and/or current of a node (e.g., input terminal, internal node, or output terminal) of the M-level converter cell 1102. The control circuitry 1100 may be incorporated into, or separate from, the overall controller 104 for a power converter 100 embodying the M-level converter cell 1102, and portions of the control circuitry 1100 may be implemented with a digital micro-controller.

A first block comprises a feedback controller 1106, which may be a traditional controller such as a fixed frequency voltage mode or current mode controller, a constant-on-time controller, a hysteretic controller, or any other variant. The feedback controller 1106 is shown as being coupled to $V_{BAT}$. In alternative embodiments, the feedback controller 1106 may be configured to monitor the input of the M-level converter cell 1102 and/or an internal node of the M-level converter cell 1102. The feedback controller 1106 produces a pulse-width modulation (PWM) signal directly or indirectly indicative of the voltage at $V_{BAT}$ that determines in general terms what needs to be done in the M-level converter cell 1102 to maintain desired values for $V_{BAT}$: charge, discharge, or tri-state (i.e., open, with no current flow).

In the illustrated example, the feedback controller 1106 includes a feedback circuit 1108, a compensation circuit 1110, and a PWM generator 1112. The feedback circuit 1108 may include, for example, a feedback-loop voltage detector which compares $V_{BAT}$ (or an attenuated version of $V_{BAT}$) to a reference voltage which represents a desired $V_{BAT}$ target voltage (which may be dynamic) and outputs a control signal to indicate whether $V_{BAT}$ is above or below the target voltage. The feedback-loop voltage detector may be implemented with a comparison device, such as an operational amplifier (op-amp) or transconductance amplifier (gm amplifier).

The compensation circuit 1110 is configured to stabilize the closed-loop response of the feedback controller 1106 by avoiding the unintentional creation of positive feedback, which may cause oscillation, and by controlling overshoot and ringing in the step response of the feedback controller 1106. The compensation circuit 1110 may be implemented in known manner and may include LC and/or RC circuits.

The PWM generator 1112 generates the actual PWM control signal which ultimately sets the duty cycle of the power switches of the M-level converter cell 1102. In some embodiments, the PWM generator 1112 may pass on additional optional control signals CTRL indicating, for example, the magnitude of the difference between $V_{BAT}$ and the reference voltage (thus indicating that some levels of the M-level converter cell 1102 should be bypassed to get to higher or lower levels), and the direction of that difference (e.g., $V_{BAT}$ being greater than or less than the reference voltage). In other embodiments, the optional control signals CTRL can be derived from the output of the compensation circuit 1110, or from the output of the feedback circuit 1108, or from a separate comparator (not shown) coupled to, for example, $V_{BAT}$. One purpose of the optional control signals CTRL is for advanced control algorithms, when it may be beneficial to know how far away $V_{BAT}$ is from a target output voltage, thus allowing faster charging of the inductor L if $V_{BAT}$ is severely under-regulated.

A second block comprises an M-level controller 1114, the primary function of which is to select the power switch states that generate a desired value for $V_{BAT}$ while maintaining a charge-balance state on the fly capacitors within the M-level converter cell 1102 every time an output voltage level is selected, regardless of what power switch state or states were used in the past.

The M-level controller 1114 includes a Voltage Level Selector 1116 which receives the PWM control signal and the additional control signals CTRL if available. In addition, the Voltage Level Selector 1116 may be coupled to $V_{BAT}$, $V_{INT}$, and/or $V_{IN}$ (only $V_{IN}$ is shown), and, in some embodiments, to HIGH/LOW voltage status signals, $C_{Fx}$ H/L, from voltage detectors (not shown) coupled across corresponding fly capacitors $C_{Fx}$ within the M-level converter cell 1102. A function of the Voltage Level Selector 1116 is to translate the received signals to a target output voltage level (e.g., on a cycle-by-cycle basis). The Voltage Level Selector 1116 typically will consider at least $V_{BAT}$, $V_{INT}$, and/or $V_{IN}$ to determine which target level should charge or discharge the output of the M-level converter cell 1102 with a desired rate, and may take into account the voltage across each fly capacitor.

The output of the Voltage Level Selector 1116 is coupled to an M-level Switch State Selector 1118, which generally would be coupled to the voltage status signals, $C_{Fx\_H/L}$, from the capacitor voltage detectors for the fly capacitors $C_{Fx}$. Taking into account the target level generated by the Voltage Level Selector 1116, the M-level Switch State Selector 1118 determines which power switch states for the desired output level should be preferred for capacitor charge-balance. The output of the M-level Switch State Selector 1118 is coupled to the power FETs of the M-level converter cell 1102 (through appropriate level-shifter circuits and drivers circuits, as may be needed for a particular converter cell) and includes the power switch state settings determined by the M-level Switch State Selector 1118 (which selects the configuration of power FETs within the M-level converter cell 1102 corresponding to a selected target level).

In general (but not always), the Voltage Level Selector 1116 and the M-level Switch State Selector 1118 only change their states when the PWM signal changes. For example, when the PWM signal goes high, the Voltage Level Selector 1116 selects which level results in charging of the inductor L and the M-level Switch State Selector 1118 sets which version of switch settings to use for that level. Then when the PWM signal goes low, the Voltage Level Selector 1116 selects which level should discharge the inductor L and the M-level Switch State Selector 1118 sets which version of that level to use. Thus, the Voltage Level Selector 1116 and the M-level Switch State Selector 1118 generally only change states when the PWM signal changes (the PWM signal is in effect their clock signal). However, there may be situations or events where it is desirable for the CTRL signals to change the state of the Voltage Level Selector 1116. In some embodiments, it may be useful to include a timing function that forces the M-level Switch State Selector 1118 to re-evaluate the optimal version of the power switch state periodically, for example, in order to avoid being "stuck" at one level for a very long time, potentially causing charge imbalances.

In embodiments that utilize the teachings set forth in the patent application entitled "Controlling Charge-Balance and Transients in a Multi-Level Power Converter" referenced above, the M-level controller 1114 implements a control method for the M-level converter cell 1102 that selects an essentially optimal power switch state which moves the fly capacitors CE towards a charge-balance state every time a voltage level at the Lx node is selected, regardless of what power switch state or states were used in the past. Accordingly, such multi-level converter circuits are free to select a different power switch state or Lx voltage level every switching cycle without a need to keep track of any prior power switch state or sequence of power switch states.

In some embodiments, the M-level Switch State Selector 1118 may take into account the magnitude and/or polarity of current $I_L$ flowing through the inductor L by way of an optional current-measurement input 1120, which may be implemented in conventional fashion.

One notable benefit of the control circuitry shown in FIG. 11 is that it enables generation of voltages in boundary zones between voltage levels, which represent unattainable output voltages for conventional multi-level DC-to-DC converter circuits.

While FIG. 11 shows a particular embodiment of control circuitry for an M-level converter cell as modified in accordance with the present invention, it should be appreciated that other control circuits may be adapted or devised to provide suitable switching signals for the power switches within a converter cell while still being able to use embodiments of the present invention.

It may be desirable to provide additional control and operational circuitry (or one or more shutdown procedures) that enables reliable and efficient operation of a power converter utilizing a multi-level converter cell designed in accordance with the present disclosure. For example, in a step-down power converter, the output voltage of a converter cell is less than the input voltage of the converter cell. Shutting down or disabling (e.g., because of a fault event, such as a short) a converter cell having a designed-in inductance connected to the output while the output load current is non-zero generally requires some means for discharging the inductor current. In some embodiments, a bypass switch may be connected in parallel with a designed-in inductance connected to the output of a converter cell and controlled to be open during normal operation and closed when shutting down the converter cell or if a fault event occurs. Ideally, in order to prevent transient ringing and to provide safe discharge of the inductor current, the bypass switch can be closed before disabling converter cell switching. In alternative embodiments using MOSFETs for the main power switches of the converter, the inherent body diode connected between the body and drain terminals of each MOSFET can also discharge the inductor current. Details of these solutions, as well as alternative shutdown solutions, are taught in U.S. Pat. No. 10,686,367, issued Jun. 16, 2020, entitled "Apparatus and Method for Efficient Shutdown of Adiabatic Charge Pumps", assigned to the assignee of the present invention, the contents of which are incorporated by reference.

Another consideration when combining converter cells in parallel is controlling multiple parallel power converters in order to avoid in-rush current (e.g., during a soft-start period for the power converters) and/or power switch over-stress if all of the power converters are not fully operational, such as during startup or when a fault condition occurs. Conditional control may be accomplished by using node status detectors coupled to selected nodes within parallel-connected power converters to monitor voltage and/or current. Such node status detectors may be configured in some embodiments to work in parallel with an output status detector measuring the output voltage of an associated power converter during startup. The node status detectors ensure that voltages across important components (e.g., fly capacitors and/or power switches) within the converter cell(s) of the power converters are within desired ranges before enabling full power steady-state operation of the parallel power converters, and otherwise prevent full power steady-state operation. The node status detectors may be coupled to a master controller that controls one or more of the parallel power converters using one or more common control signals. In furtherance of a master controller configuration, the parallel power converters may each report a power good signal (Pgood) when ready to leave a startup phase for full power steady-state operation. The master controller may essentially "AND" all such Pgood signals together, possibly along with one or more status signals from other circuits, such that the master controller does not enable full power steady-state operation of any the parallel power converter unless all of the parallel power converters are ready for that state. In essence, the Pgood signals from each parallel power converter are all tied together such that the parallel power converters may not transition out of startup phase until all the Pgood signals indicate that they are ready to transition to steady operation. Furthermore, if the Pgood signal changes due to a fault condition in one or more of the parallel power converters, the parallel power converters can transition from a steady state operation to an auto-restart or shutdown operation. Details of these solutions, as well as alternative shutdown solutions, are taught in U.S. Pat. No. 10,992,226, issued Apr. 27, 2021, entitled "Startup Detection for Parallel Power Converters", assigned to the assignee of the present invention, the contents of which are incorporated by reference.

Another solution to balancing capacitor voltages in a multi-level DC-to-DC converter circuit is to provide a lossless voltage balancing solution where out-of-order state transitions of a multi-level DC-to-DC converter cell are allowed to take place during normal operation. The net effect of out-of-order state transitions is to increase or decrease the voltage across specific fly capacitors, thus preventing voltage overstress on the main power switches of the DC-to-DC converter. In some embodiments, restrictions are placed on the overall sequence of state transitions to reduce or avoid transition state toggling, thereby allowing each capacitor an opportunity to have its voltage steered as necessary, rather than allowing one capacitor to be voltage balanced before voltage balancing another capacitor. Details of this solution, as well as alternative charge balancing solutions, are taught in U.S. Pat. No. 10,770,974, issued Sep. 8, 2020, entitled "Multi-Level DC-DC Converter with Lossless Voltage Balancing", assigned to the assignee of the present invention, the contents of which are incorporated by reference.

An additional consideration for some embodiments is enabling operation of multi-level converter cells such that voltages can be generated in boundaries zones between voltage levels. "Boundary zones" represent unattainable output voltages for conventional multi-level DC-to-DC converter circuits. In order to generate output voltages within a boundary zone, some embodiments essentially alternate (toggle) among adjacent (or even nearby) zones by setting states of the converter cell power switches in a boundary zone transition pattern. For example, a 3-level DC-to-DC converter circuit may operate in Zone 1 for a selected time and in adjacent Zone 2 for a selected time. Thus, Zones 1 and 2 are treated as a single "super-zone". More generally, in some cases, it may be useful to create super-zones using non-adjacent zones or using more than two zones (adjacent and/or non-adjacent). Details of this solution are taught in U.S. Pat. No. 10,720,842, issued Jul. 21, 2020, entitled "Multi-Level DC-DC Converter with Boundary Transition Control", assigned to the assignee of the present invention, the contents of which are incorporated by reference.

Yet another consideration for some embodiments is protection of the main power switches and other components within a power converter from stress conditions, particular from voltages that exceed the breakdown voltage of such power switches (particularly FET switches). One means for protecting a multi-level power converter uses at least one high-voltage FET power switch while allowing all or most other main power switches to be low-voltage FET switches.

More generally, multi-level power converters provide or enable numerous benefits and advantages, including:

- adaptability to applications in which input and/or output voltages may have a wide dynamic-range (e.g., varying battery input voltage levels, varying output voltages);
- efficiency improvements on the run-time of devices operating on portable electrical energy sources (batteries, generators or fuel cells using liquid or gaseous fuels, solar cells, etc.);
- efficiency improvements where efficiency is important for thermal management, particularly to protect other components (e.g., displays, nearby ICs) from excessive heat;
- enabling design optimizations for power efficiency, power density, and form-factor of the power converter—for example, smaller-size multi-level power converters may allow placing power converters in close proximity to loads, thus increasing efficiency, and/or to lower an overall bill of materials;
- the ability to take advantage of the performance of smaller, low voltage transistors;
- adaptability to applications in which power sources can vary widely, such as batteries, other power converters, generators or fuel cells using liquid or gaseous fuels, solar cells, line voltage (AC), and DC voltage sources (e.g., USB, USB-C, power-over Ethernet, etc.);
- adaptability to applications in which loads may vary widely, such as ICs in general (including microprocessors and memory ICs), electrical motors and actuators, transducers, sensors, and displays (e.g., LCDs and LEDs of all types);
- the ability to be implemented in a number of IC technologies (e.g., MOSFETs, GaN, GaAs, and bulk silicon) and packaging technologies (e.g., flip chips, ball-grid arrays, wafer level scale chip packages, wide-fan out packaging, and embedded packaging).

As should be clear, the multi-level power converter embodiments described in this disclosure may be synergistically combined with the teachings of one or more of the additional control and operational circuits and methods described in this section.

One advantage of embodiments of the present invention is fast power-up times. For example, the inventive pre-charging process allows startup of a power converter cell to occur in the low tens of milliseconds at 1-2 amps without requiring extra components, instead utilizing existing power converter circuitry in a novel manner. Other advantages of embodiments of the present invention include small IC area, limitation of in-rush current during startup, and control fly capacitor pre-charging. Further, embodiments of the current invention improve the power density and/or power efficiency of incorporating circuits and circuit modules or blocks. As a person of ordinary skill in the art should understand, a system architecture is beneficially impacted utilizing embodiments of the current invention in critical ways, including lower power and/or longer battery life. The current invention therefore specifically encompasses system-level embodiments that are creatively enabled by inclusion in a large system design and application.

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments of this invention are often used in modules in which one or more of such ICs are combined with other circuit components or blocks (e.g., filters, amplifiers, passive components, and possibly additional ICs) into one package. The ICs and/or modules are then typically combined with other components, often on a printed circuit board, to form part of an end-product such as a cellular telephone, laptop computer, or electronic tablet, or to form a higher-level module which may be used in a wide variety of products, such as vehicles, test equipment, medical devices, etc. Through various configurations of modules and assemblies, such ICs typically enable a mode of communication, often wireless communication.

The advantages and benefits of multi-level power converters enable usage in a wide array of applications. For example, applications of multi-level power converters include portable and mobile computing and/or communication products and components (e.g., notebook computers, ultra-book computers, tablet devices, and cell phones), displays (e.g., LCDs, LEDs), radio-based devices and systems (e.g., cellular systems, WiFi, Bluetooth, Zigbee, Z-Wave, and GPS-based devices), wired network devices and systems, data centers (e.g., for battery-backup systems and/or power conversion for processing systems and/or electronic/optical networking systems), internet-of-things (IoT) devices (e.g., smart switches and lights, safety sensors, and security cameras), household appliances and electronics (e.g., set-top boxes, battery-operated vacuum cleaners, appliances with built-in radio transceivers such as washers, dryers, and refrigerators), AC/DC power converters, electric vehicles of all types (e.g., for drive trains, control systems, and/or infotainment systems), and other devices and systems that utilize portable electricity generating sources and/or require power conversion.

Radio system usage includes wireless RF systems (including base stations, relay stations, and hand-held transceivers) that use various technologies and protocols, including various types of orthogonal frequency-division multiplexing ("OFDM"), quadrature amplitude modulation ("QAM"), Code-Division Multiple Access ("CDMA"), Time-Division Multiple Access ("TDMA"), Wide Band Code Division Multiple Access ("W-CDMA"), Global System for Mobile Communications ("GSM"), Long Term Evolution ("LTE"), 5G, 6G, and WiFi (e.g., 802.11a, b, g, ac, ax, be) protocols, as well as other radio communication standards and protocols.

Figure 12:
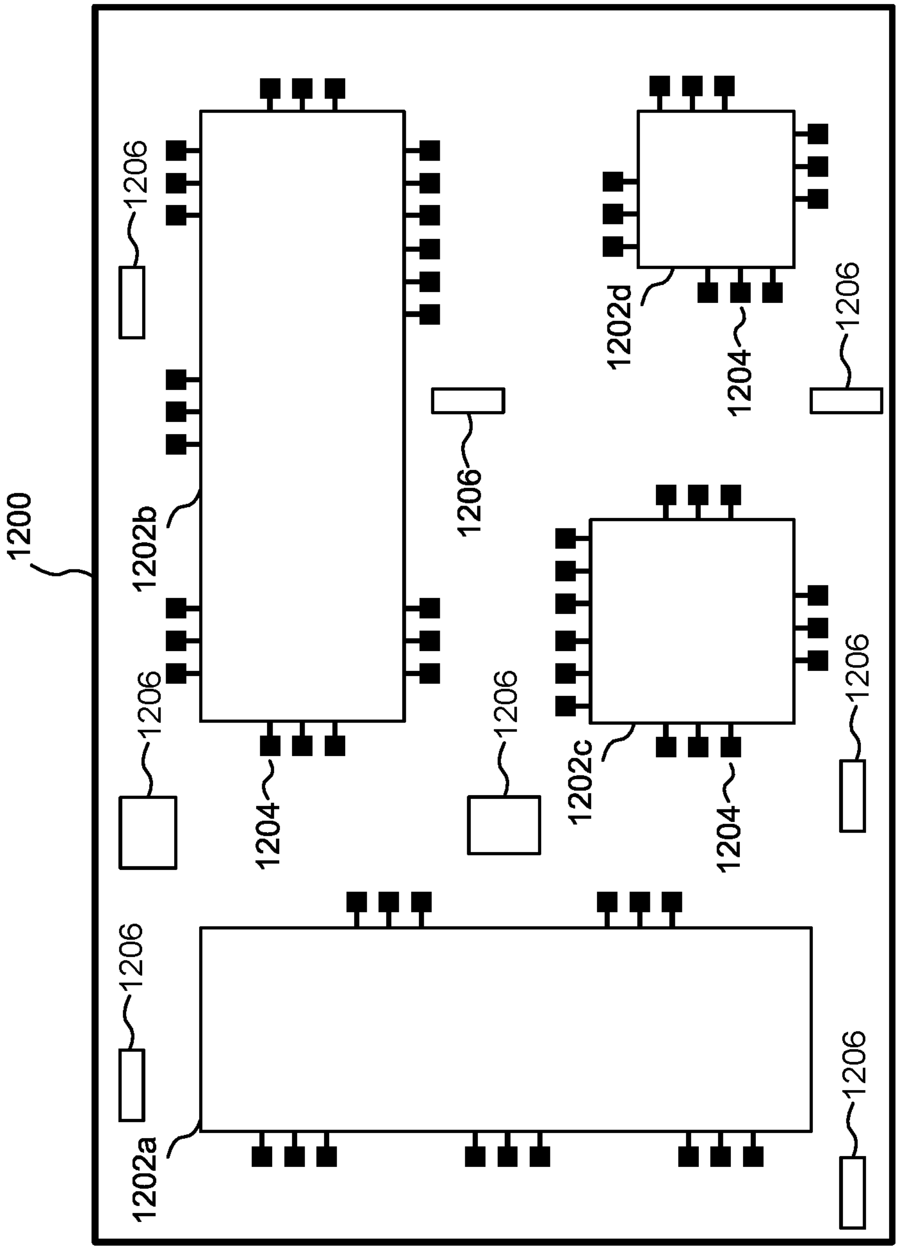
FIG. 12 is a top plan view of a substrate that may be, for example, a printed circuit board or chip module substrate (e.g., a thin-film tile).

As one example of integration of embodiments of the present invention with other components, FIG. 12 is a top plan view of a substrate 1200 that may be, for example, a printed circuit board or chip module substrate (e.g., a thin-film tile). In the illustrated example, the substrate 1200 includes multiple ICs 1202*a*-1202*d* having terminal pads 1204 which would be interconnected by conductive vias and/or traces on and/or within the substrate 1200 or on the opposite (back) surface of the substrate 1200 (to avoid clutter, the surface conductive traces are not shown and not all terminal pads are labelled). The ICs 1202*a*-1202*d* may embody, for example, signal switches, active and/or passive filters, amplifiers (including one or more LNAs), and other circuitry. For example, IC 1202*b* may incorporate one or more instances of the converter cell 600 shown in FIG. 6A The substrate 1200 may also include one or more passive devices 1206 embedded in, formed on, and/or affixed to the substrate 1200. While shown as generic rectangles, the passive devices 1206 may be, for example, filters, capacitors, inductors, transmission lines, resistors, antennae elements, transducers (including, for example, MEMS-based transducers, such as accelerometers, gyroscopes, microphones, pressure sensors, etc.), batteries, etc., interconnected by conductive traces on or in the substrate 1200 to other passive devices 1206 and/or the individual ICs 1202*a*-1202*d*. The front or back surface of the substrate 1200 may be used as a location for the formation of other structures.

Figure 13:
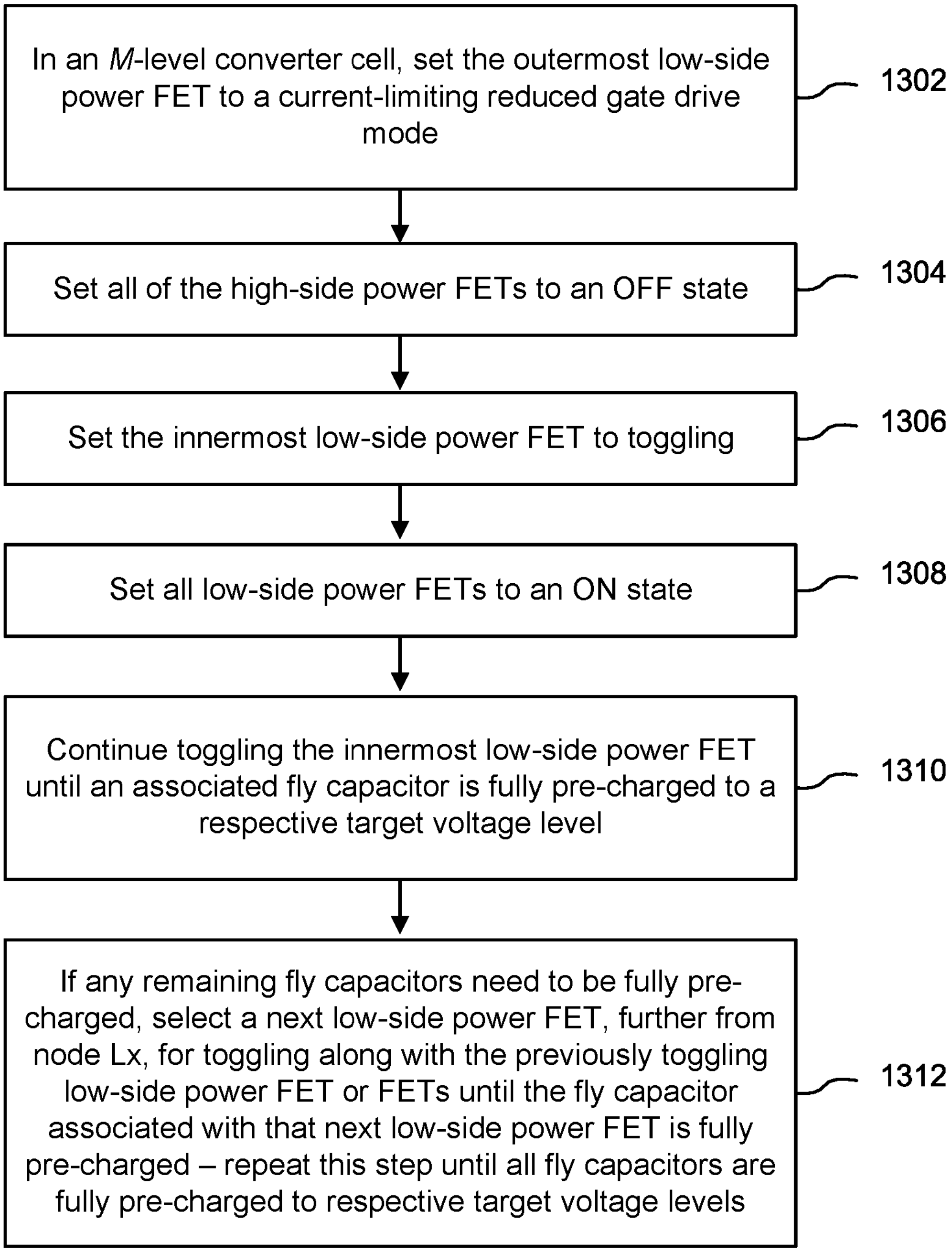
FIG. 13 is a process flow chart showing one method of pre-charging at least one fly capacitor coupled to an M-level converter cell.

Another aspect of the invention includes methods for pre-charging at least one capacitor coupled to an M-level converter cell. For example, FIG. 13 is a process flow chart 1300 showing one method of pre-charging at least one fly capacitor coupled to an M-level converter cell. In this example, the M-level converter cell includes a node, a plurality of high-side power FETs coupled in series to the node, a plurality of low-side power FETs coupled in series to the node, and an inductor coupled to the node and configured to be coupled to a battery, wherein the M-level converter cell is configured to be connected to the at least one fly capacitor between a first pair of power FETs of the plurality of high-side power FETs and a second pair of power FETs of the plurality of low-side power FETs. Note that for 4-level and above power converters, all fly capacitors should be initially discharged so as to start from 0V. The method includes: for the duration of pre-charging, set the outermost low-side power FET to an ON state but in a current-limiting reduced gate drive mode (Block 1302); set all of the high-side power FETs to an OFF state (Block 1304); set the innermost low-side power FET, next to node Lx, to toggling (Block 1306); set all other low-side power FETs to an ON state (Block 1308); continue toggling the innermost low-side power FET until an associated fly capacitor is fully pre-charged to a respective target voltage level (Block 1310); and, if any remaining fly capacitors need to be fully pre-charged, select a next low-side power FET, further from node Lx, for toggling along with the previously toggling low-side power FET or FETs until the fly capacitor associated with that next low-side power FET is fully pre-charged-repeat this step until all fly capacitors are fully pre-charged to respective target voltage levels (Block 1312).

Additional aspects of the above method may include one or more of the following: wherein pre-charging of each of the at least one capacitor is through an inherent body diode of a respective high-side power FET; further including sensing current through the inductor and setting any toggling low-side power FETs in an ON state to an OFF state if current through the inductor exceeds a selected level; further including sensing current through the inductor and preventing any low-side power FETs from toggling from an OFF state to an ON state until current flow through the inductor is close to zero; and/or wherein the outermost low-side power FET is controlled by a driver circuit powered by a reduced gate drive circuit configured to selectively set the outermost low-side power FET to a full gate-drive mode or to a current-limiting reduced gate-drive mode.

Figure 14:
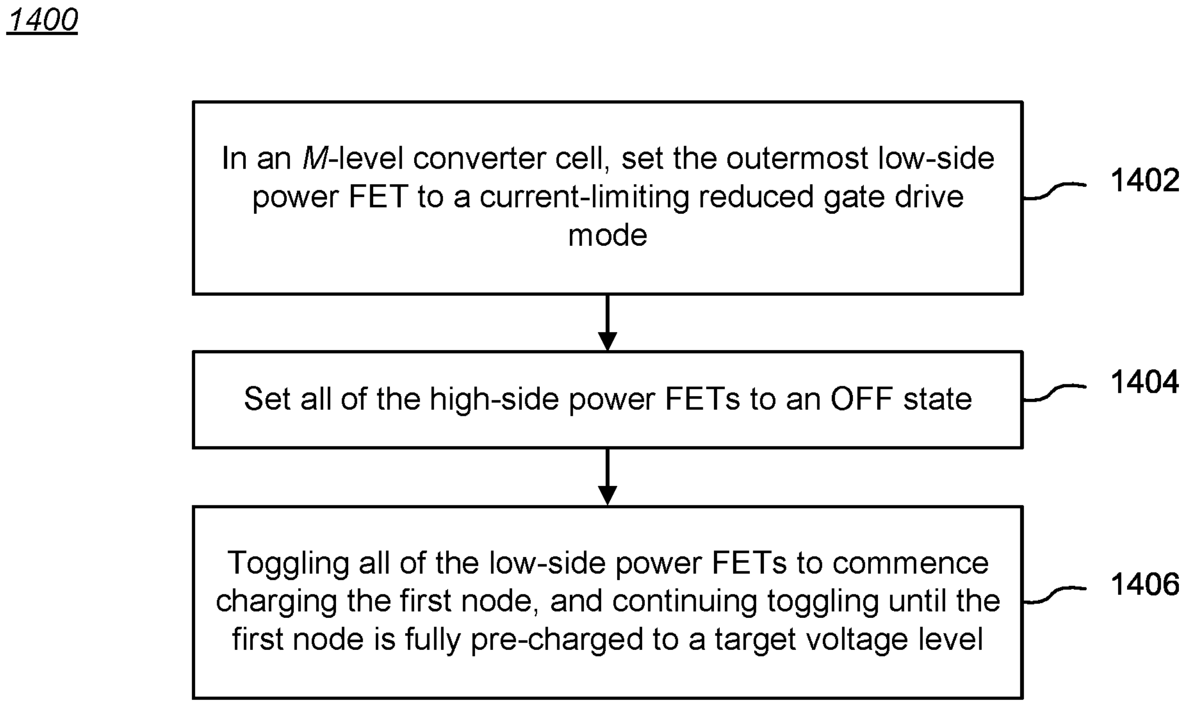
FIG. 14 is a process flow chart showing one method of pre-charging a voltage node of an M-level converter cell.

Another aspect of the invention includes methods for pre-charging other nodes of an M-level converter cell. For example, FIG. 14 is a process flow chart 1400 showing one method of pre-charging a voltage node of an M-level converter cell. In this example, the M-level converter cell includes a first node of an M-level converter cell that includes a second node, a plurality of high-side power FETs coupled in series between the first node and the second node, a plurality of low-side power FETs coupled in series to the second node, and an inductor coupled to the second node and configured to be coupled to a battery. The method includes: for the duration of pre-charging, set the outermost low-side power FET to a current-limiting reduced gate drive mode (Block 1402); set all of the high-side power FETs to an OFF state (Block 1404); toggling all of the low-side power FETs to commence charging the first node, and continuing toggling until the first node is fully pre-charged to a target voltage level (Block 1406);

Additional aspects of the above method may include one or more of the following: wherein pre-charging of the first node is through a respective inherent body diode of each high-side power FET; further including sensing current through the inductor and setting the innermost low-side power FET from an ON state to an OFF state if current through the inductor exceeds a selected level; further including sensing current through the inductor and preventing the innermost low-side power FET from toggling from an OFF state to an ON state until current flow through the inductor is close to zero; and/or wherein the outermost low-side power FET is controlled by a driver circuit powered by a reduced gate drive circuit configured to selectively set the outermost low-side power FET to a full gate-drive mode or to a current-limiting reduced gate-drive mode.

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As used in this disclosure, the term "radio frequency" (RF) refers to a rate of oscillation in the range of about 3 kHz to about 300 GHz. This term also includes the frequencies used in wireless communication systems. An RF frequency may be the frequency of an electromagnetic wave or of an alternating voltage or current in a circuit.

With respect to the figures referenced in this disclosure, the dimensions for the various elements are not to scale; some dimensions may be greatly exaggerated vertically and/or horizontally for clarity or emphasis. In addition, references to orientations and directions (e.g., "top", "bottom", "above", "below", "lateral", "vertical", "horizontal", etc.) are relative to the example drawings, and not necessarily absolute orientations or directions.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies, such as bipolar junction transistors (BJTs), BICMOS, LDMOS, BCD, GaAs HBT, GaN HEMT, GaAs pHEMT, MESFET, InP HBT, InP HEMT, FinFET, GAAFET, and SiC-based device technologies, using 2-D, 2.5-D, and 3-D structures. However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 300 GHz). Monolithic IC implementation is particularly useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A method of pre-charging a first fly capacitor coupled to an multi-level converter cell that includes a node, a plurality of high-side power FETs coupled in series to the node, a plurality of low-side power FETs coupled in series to the node, and an inductor coupled to the node and configured to be coupled to a battery, wherein the multi-level converter cell is configured to be connected to the first fly capacitor between a first pair of power FETs of the plurality of high-side power FETs and a second pair of power FETs of the plurality of low-side power FETs, the method including:

switching an outermost low-side power FET in the second pair of power FETs on in a current-limiting reduced gate drive mode;

setting all of the plurality of high-side power FETs to an OFF state;

setting all of the plurality of low-side power FETs, except an innermost low-side power FET closest to the node and except the outermost low-side power FET, to an ON state; and toggling the innermost low-side power FET on and off until the first fly capacitor is fully pre-charged to a respective target voltage level.

2. The method of claim 1, wherein pre-charging the first fly capacitor is through an inherent body diode of a respective high-side power FET.

3. The method of claim 1, further including sensing current through the inductor and stopping the toggling of the innermost low-side power FET if a sensed current through the inductor exceeds a selected level.

4. The method of claim 3, further including sensing current through the inductor and preventing any low-side power FETs from toggling from an OFF state to an ON state until current flow through the inductor is close to zero.

5. The method of claim 1, wherein the outermost low-side power FET is controlled by a driver circuit powered by a reduced gate drive circuit.

6. A circuit configuration for a multi-level converter cell for pre-charging a first fly capacitor coupled to the multi-level converter cell, wherein the multi-level converter cell includes a node, a plurality of high-side power FETs coupled in series to the node, a plurality of low-side power FETs coupled in series to the node, and an inductor coupled to the node and configured to be coupled to a battery, wherein the multi-level converter cell is configured to be connected to the first fly capacitor between a first pair of power FETs of the plurality of high-side power FETs and a second pair of power FETs of the plurality of low-side power FETs, the circuit configuration including:

an outermost low-side power FET in the second pair of power FETs set to an ON state in a current-limiting reduced gate drive mode;

all of the plurality of high-side power FETs set to an OFF state;

all of the plurality of low-side power FETs, except an innermost low-side power FET closest to the node and except the outermost low-side power FET, set to an ON state; and the innermost low-side power FET set to toggling on and off until the first fly capacitor is fully pre-charged to a respective target voltage level.

7. The circuit configuration of claim 6, wherein the first fly capacitor is pre-charged through an inherent body diode of a respective high-side power FET.

8. The circuit configuration of claim 6, further including a first sensor coupled to the multi-level converter cell and configured to cease any toggling of the outermost low-side power FET if current through the inductor exceeds a selected level.

9. The circuit configuration of claim 8, further including a second sensor coupled to the multi-level converter cell and configured to prevent any low-side power FETs from toggling from an OFF state to an ON state until current flow through the inductor is close to zero.

10. The circuit configuration of claim 6, wherein the outermost low-side power FET is controlled by a driver circuit powered by a reduced gate drive circuit.

11. The circuit configuration of claim 6, further comprising a plurality of level-shifters, wherein a gate of each high-side power FET and a gate of each low-side power FET is coupled to a respective level-shifter from the plurality of level-shifters.

12. The circuit configuration of claim 6, wherein the battery comprises a mobile device battery.

13. A circuit configuration for a multi-level converter cell for pre-charging a first fly capacitor coupled to the multi-level converter cell, wherein the multi-level converter cell includes a node, a plurality of high-side power FETs coupled in series to the node, a plurality of low-side power FETs coupled in series to the node, and an inductor coupled to the node and configured to be coupled to a battery, wherein the multi-level converter cell is configured to be connected to the first fly capacitor between an innermost pair of power FETs of the plurality of high-side power FETs and an innermost pair of power FETs of the plurality of low-side power FETs, the circuit configuration including:

an outermost low-side power FET set to toggling on and off in a current-limiting reduced gate drive mode;

all of the plurality of high-side power FETs set to an OFF state;

all of the plurality of low-side power FETs, except an innermost low-side power FET closest to the node and except the outermost low-side power FET, set to an ON state; and the innermost low-side power FET set to toggling on and off in an opposite phase as compared to the outermost low-side power FET until the first fly capacitor is fully pre-charged to a respective target voltage level.

14. The circuit configuration of claim 13, wherein the first fly capacitor is pre-charged through an inherent body diode of a respective high-side power FET.

15. The circuit configuration of claim 13, further including a first sensor coupled to the multi-level converter cell and configured to stop the toggling of the innermost low-side power FET if current through the inductor exceeds a selected level.

16. The circuit configuration of claim 15, further including a second sensor coupled to the multi-level converter cell and configured to prevent the innermost low-side power FET from toggling from an OFF state to an ON state until current flow through the inductor is close to zero.

17. The circuit configuration of claim 13, wherein the outermost low-side power FET is controlled by a driver circuit powered by a reduced gate drive circuit.

18. The circuit configuration of claim 13, further comprising a plurality of level-shifters, wherein a gate of each high-side power FET and a gate of each low-side power FET is coupled to a respective level-shifter from the plurality of level-shifters.

19. The circuit configuration of claim 13, wherein the battery comprises a mobile device battery.

* * * * *